(12) United States Patent
Lim et al.

(10) Patent No.: US 12,092,370 B2
(45) Date of Patent: Sep. 17, 2024

(54) FLUID HEATER

(71) Applicant: Hanon Systems, Daejeon (KR)

(72) Inventors: Cha You Lim, Daejeon (KR); Hyun Seok Jung, Daejeon (KR)

(73) Assignee: Hanon Systems, Daejeon (KR)

( * ) Notice: Subject to any disclaimer, the term of this patent is extended or adjusted under 35 U.S.C. 154(b) by 893 days.

(21) Appl. No.: 17/260,505

(22) PCT Filed: Jul. 19, 2019

(86) PCT No.: PCT/KR2019/008923
§ 371 (c)(1),
(2) Date: Jan. 14, 2021

(87) PCT Pub. No.: WO2020/032417
PCT Pub. Date: Feb. 13, 2020

(65) Prior Publication Data
US 2022/0003455 A1    Jan. 6, 2022

(30) Foreign Application Priority Data

Aug. 9, 2018 (KR) .................. 10-2018-0093051
Sep. 11, 2018 (KR) .................. 10-2018-0108440

(51) Int. Cl.
*F24H 9/1818* (2022.01)
*B60H 1/22* (2006.01)
(Continued)

(52) U.S. Cl.
CPC ......... *F24H 9/1818* (2013.01); *B60H 1/2221* (2013.01); *F15D 1/04* (2013.01);
(Continued)

(58) Field of Classification Search
CPC ...... F24H 9/1818; F24H 9/0015; F24H 1/009; F24H 1/142; F24H 2250/02; B60H 1/2221; F15D 1/04
See application file for complete search history.

(56) References Cited

U.S. PATENT DOCUMENTS

2011/0241334 A1*  10/2011  Kawano ................... F15D 1/04
                                                       285/179

FOREIGN PATENT DOCUMENTS

CN      102213253 A      10/2011
JP      H07239155 A       9/1995
(Continued)

OTHER PUBLICATIONS

Office Action issued on Jul. 25, 2022 by the KIPO in the corresponding Patent Application No. KR 10-2018-0108440, with English translation.
(Continued)

*Primary Examiner* — Shawntina T Fuqua
(74) *Attorney, Agent, or Firm* — Norton Rose Fulbright US LLP; James R. Crawford

(57) ABSTRACT

Disclosed in an embodiment is a fluid heater including a main body including a partitioning part having a plate shape and a flow passage forming part forming a flow passage on the other surface of the partitioning part, a heating plate disposed on the flow passage forming part and having a plate shape and including a heating pattern having a shape corresponding to the flow passage, a circuit board disposed on one surface of the partitioning part and configured to control the heating pattern to generate heat, and a bus bar electrically connecting the heating pattern and the circuit board, wherein the flow passage forming part includes a turning vane disposed in a curved flow passage of the flow passage.

15 Claims, 26 Drawing Sheets

(51) Int. Cl.
  *F15D 1/04* (2006.01)
  *F24H 1/00* (2022.01)
  *F24H 1/14* (2022.01)
  *F24H 9/00* (2022.01)
(52) U.S. Cl.
  CPC ............. *F24H 1/009* (2013.01); *F24H 1/142* (2013.01); *F24H 9/0015* (2013.01); *F24H 2250/02* (2013.01)

(56) References Cited

FOREIGN PATENT DOCUMENTS

| | | | |
|---|---|---|---|
| JP | 2012112624 A | * | 6/2012 |
| JP | 2013220708 A | | 10/2013 |
| KR | 950033125 A | | 12/1995 |
| KR | 10-0174734 B1 | | 4/1999 |
| KR | 10-2012-0121719 A | | 11/2012 |
| KR | 10-2012-0132297 A | | 12/2012 |
| KR | 101460250 B1 | | 11/2014 |
| KR | 20140134023 A | | 11/2014 |
| KR | 101752490 B1 | | 7/2017 |
| KR | 10-2018-0075777 A | | 7/2018 |
| KR | 20180075777 A | * | 7/2018 |
| KR | 20230105454 A | * | 7/2023 |

OTHER PUBLICATIONS

Office Action issued on Nov. 17, 2022 by the KIPO in the corresponding Patent Application No. 10-2018-0093051, with English translation.

Office Action issued on Sep. 15, 2021 by the CIPO in the corresponding Patent Application No. CN 201980052635.7, with English translation.

* cited by examiner

FLUID HEATER

CROSS REFERENCE TO RELATED APPLICATIONS

This application is a national phase under 35 U.S.C. § 371 of International Application No. PCT/KR2019/008923 filed Jul. 19, 2019, which claims the benefit of priority from Korean Patent Application Nos. 10-2018-0093051 filed on Aug. 9, 2018 and 10-2018-0108440 filed on Sep. 11, 2018. The entire contents of these applications are incorporated herein by reference in their entirety.

TECHNICAL FIELD

The present invention relates to a fluid heater.

BACKGROUND ART

Currently, engines are used as driving sources in most common vehicles. In the engines, gasoline, diesel, and the like are used as energy sources, and these energy sources have various problems such as not only environmental pollution but also reduction of oil reserves. Accordingly, needs for new energy sources are increasingly emerging, and vehicles, for example, electric vehicles in which new energy sources are used, are being developed or are reaching stages of practical use.

However, since the electric vehicles do not include heat sources such as engines generating a great deal of heat, it is necessary to install additional heat sources to be used in vehicle air conditioners and the like.

Heat pumps and electric heaters additionally installed in the conventional electric vehicles and the like are used as the heat sources, and among them, since the electric heaters may be applied thereto without changing designs of the conventional air conditioners, the electric heaters are widely used. The electric heaters are mainly classified into air heating heaters configured to directly heat air blown into interiors of the vehicles and fluid heaters (or coolant heaters) configured to indirectly heat air through methods of heating a coolant which is heat-exchanged with the air.

Technical Problem

The present invention is directed to providing a fluid heater by which a flow distribution is uniformly formed.

The present invention is directed to providing a fluid heater by which an amount of decrease in a pressure of a fluid is reduced.

Objectives that should be solved by the present invention are not limited to the above-described objectives and include purposes or effects which may be achieved through solutions or embodiments of the problems described below.

Technical Solution

One aspect of the present invention provides a fluid heater including a main body including a partitioning part having a plate shape and a flow passage forming part forming a flow passage on the other surface of the partitioning part, a heating plate disposed on the flow passage forming part and having a plate shape and including a heating pattern having a shape corresponding to the flow passage, a circuit board disposed on one surface of the partitioning part, and a bus bar electrically connecting the heating pattern and the circuit board, wherein the flow passage includes a plurality of linear flow passages and a plurality of curved flow passages which are alternately connected, and the flow passage forming part includes a turning vane configured to guide a fluid discharged from the curved flow passage to the linear flow passage to flow toward an inner wall of the linear flow passage.

The flow passage forming part may include a first linear part, a second linear part, and a third linear part, which are disposed in parallel, and a curved part connecting the first linear part and the third linear part, the turning vane may be disposed between the second linear part and the curved part, the turning vane may be divided into a first curvature part and a second curvature part by an extension line of the second linear part, and an end portion of the second curvature part may be disposed to face the second linear part.

A central angle of the second curvature part may be greater than 90°.

A central angle of the second curvature part may be in the range of 110° to 130°.

A central angle of the first curvature part may be greater than or equal to 90°.

A curvature center of the first curvature part may match a curvature center of the curved part.

The curvature center of the first curvature part may be disposed on an end portion of the second linear part.

A ratio of a curvature radius of the curved part to a curvature radius of the first curvature part may be in the range of 2:1 to 4:1.

A curvature radius of the second curvature part may be less than a curvature radius of the first curvature part.

A curvature center of the second curvature part may be disposed on the extension line of the second linear part.

The curvature center of the second curvature part may be closer to the curved part than a curvature center of the first curvature part in a direction in which the second linear part extends.

The main body may include an inlet port through which the fluid is supplied to the flow passage and an outlet port through which the fluid is discharged from the flow passage, the flow passage may extend from the inlet port to the outlet port, and the second curvature part may be disposed closer to the outlet port than the first curvature part.

Another aspect of the present invention provides a fluid heater including a main body including a partitioning part having a plate shape and a flow passage forming part forming a flow passage on one surface of the partitioning part, a heating plate disposed on the flow passage forming part and having a plate shape and including a heating pattern having a shape corresponding to the flow passage, a circuit board disposed on the other surface of the partitioning part and configured to control the heating pattern to generate heat, and a bus bar electrically connecting the heating pattern and the circuit board, wherein the flow passage includes a central flow passage having a linear shape, a first spiral flow passage connected to a first end of the central flow passage, and a second spiral flow passage connected to a second end of the central flow passage.

The first spiral flow passage may extend from the first end of the central flow passage in a clockwise or counterclockwise direction, and the second spiral flow passage may extend from the second end of the central flow passage in a direction which is the same as the direction of the first spiral flow passage.

The main body may include an inlet port through which a fluid is supplied to the flow passage and an outlet port through which the fluid is discharged from the flow passage, the first spiral flow passage may be connected to the inlet port, and the second spiral flow passage may be connected to the outlet port.

The inlet port and the outlet port may be disposed close to each other.

Each of the first spiral flow passage and the second spiral flow passage may include a plurality of linear flow passages and a plurality of curved flow passages which are alternately connected, and the flow passage forming part may include a first turning vane configured to guide the fluid discharged from a first linear flow passage of the first spiral flow passage to the central flow passage through a first curved flow passage to flow toward a first linear part between the first linear flow passage and the central flow passage and a second turning vane configured to guide the fluid discharged from the central flow passage to the second linear flow passage through a second curved flow passage of the second spiral flow passage to flow a second linear part between the central flow passage and the second linear flow passage.

The flow passage forming part may include a first curved part defining the first curved flow passage and a second curved part defining the second curved flow passage, the first turning vane may be disposed between the first linear part and the first curved part, and the second turning vane may be disposed between the second linear part and the second curved part.

The first turning vane may be divided into a first-1 curvature part and a first-2 curvature part by an extension line of the first linear part, the second turning vane may be divided into a second-1 curvature part and a second-2 curvature part by an extension line of the second linear part, an end portion of the first-2 curvature part disposed at a downstream side from the first-1 curvature part in the flow passage may be disposed to face the first linear part, and an end portion of the second-2 curvature part disposed at a downstream side from the second-1 curvature part in the flow passage may be disposed to face the second linear part.

A central angle of the first-2 curvature part and a central angle of the second-2 curvature part may be greater than 90°.

A curvature radius of the first-2 curvature part may be less than a curvature radius of the first-1 curvature part, and a curvature radius of the second-2 curvature part may be less than a curvature radius of the second-1 curvature part.

The flow passage forming part may include a guide vane disposed at a side of the outlet port of the second spiral flow passage, and the guide vane may extend parallel to an inner surface of the second spiral flow passage.

The fluid heater may include a water temperature sensor disposed in an insertion hole passing through the partitioning part and connected to the second spiral flow passage, and an end portion of the water temperature sensor may be disposed at a side of the outlet port of the second spiral flow passage.

The flow passage forming part may include a plurality of linear parts, which are disposed in parallel, and a plurality of curved parts connecting the plurality of linear parts, and a gas discharge groove may be formed in the linear part or the curved part.

The gas discharge groove may connect the first spiral flow passage and the second spiral flow passage.

Advantageous Effects

According to embodiments, a turning vane is installed to uniformly form a flow distribution.

In addition, since a flow passage is not formed in a zigzag shape but formed in a spiral shape, an amount of decrease in fluid pressure can be reduced. Particularly, a pair of spiral flow passages are disposed around a central flow passage so that an inlet port and an outlet port are disposed close to each other at a periphery of the spiral flow passages. A flow direction of a fluid can be changed from a clockwise direction to a counterclockwise direction or vice versa before and after the fluid is introduced into the central flow passage.

Various and useful advantages and effects of the present invention are not limited to the above-described contents and will be more easily understood through a process of describing the specific embodiments of the present invention.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and one or more components of the embodiments may be selectively coupled, substituted, and used to realize the technical spirit within the range of the technical spirit.

In addition, unless clearly and specifically defined otherwise by context, all terms (including technical and scientific terms) used herein can be interpreted in a sense generally understandable to those skilled in the art, and meanings of generally used terms, such as those defined in commonly used dictionaries, will be interpreted in consideration of contextual meanings of the related technology.

In addition, the terms used in the embodiments of the present invention are considered in a descriptive sense and not to limit the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

It should be understood that, when an element is referred to as being "connected or coupled" to another element, such a description may include both a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed to be in direct contact with each other and a case in which one or more other elements are interposed between the two elements. In addition, when one element is described as being formed "on or under" another element, such a description may include a case in which the one element is formed at an upper side or a lower side with respect to another element.

Figure 1:
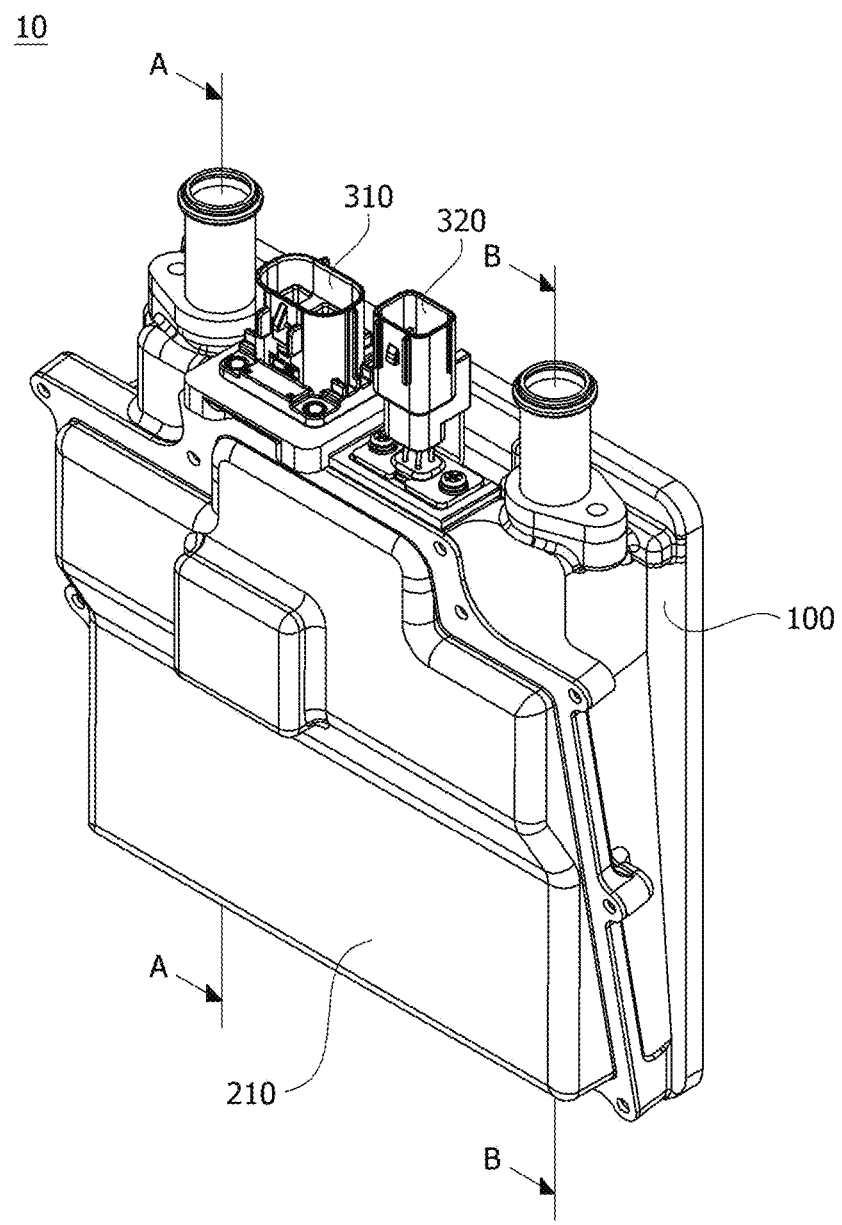
FIG. 1 is a perspective view illustrating a fluid heater according to a first embodiment of the present invention.
Figure 2:
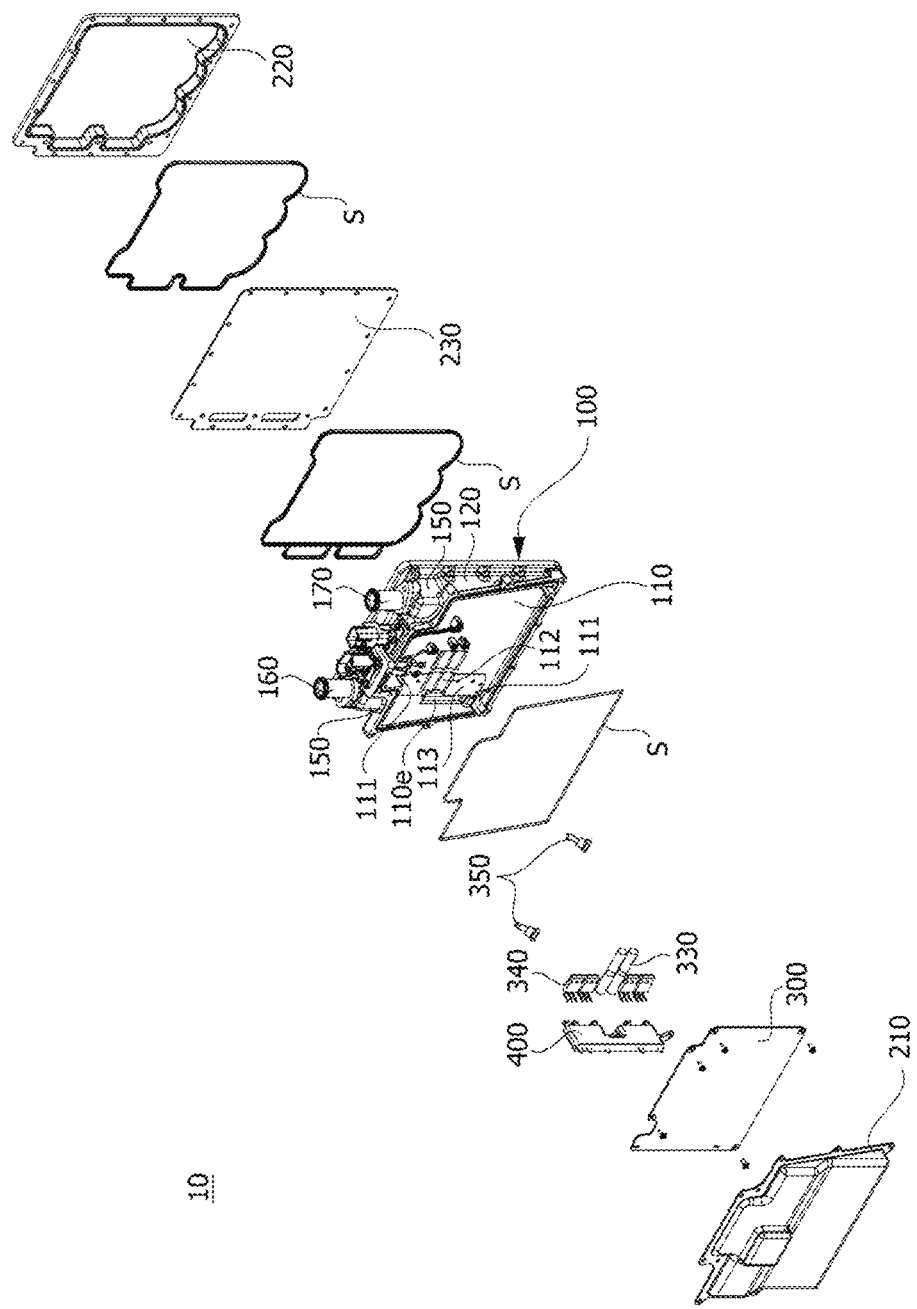
FIGS. 2 and 3 are exploded perspective views of FIG. 1.
Figure 3:
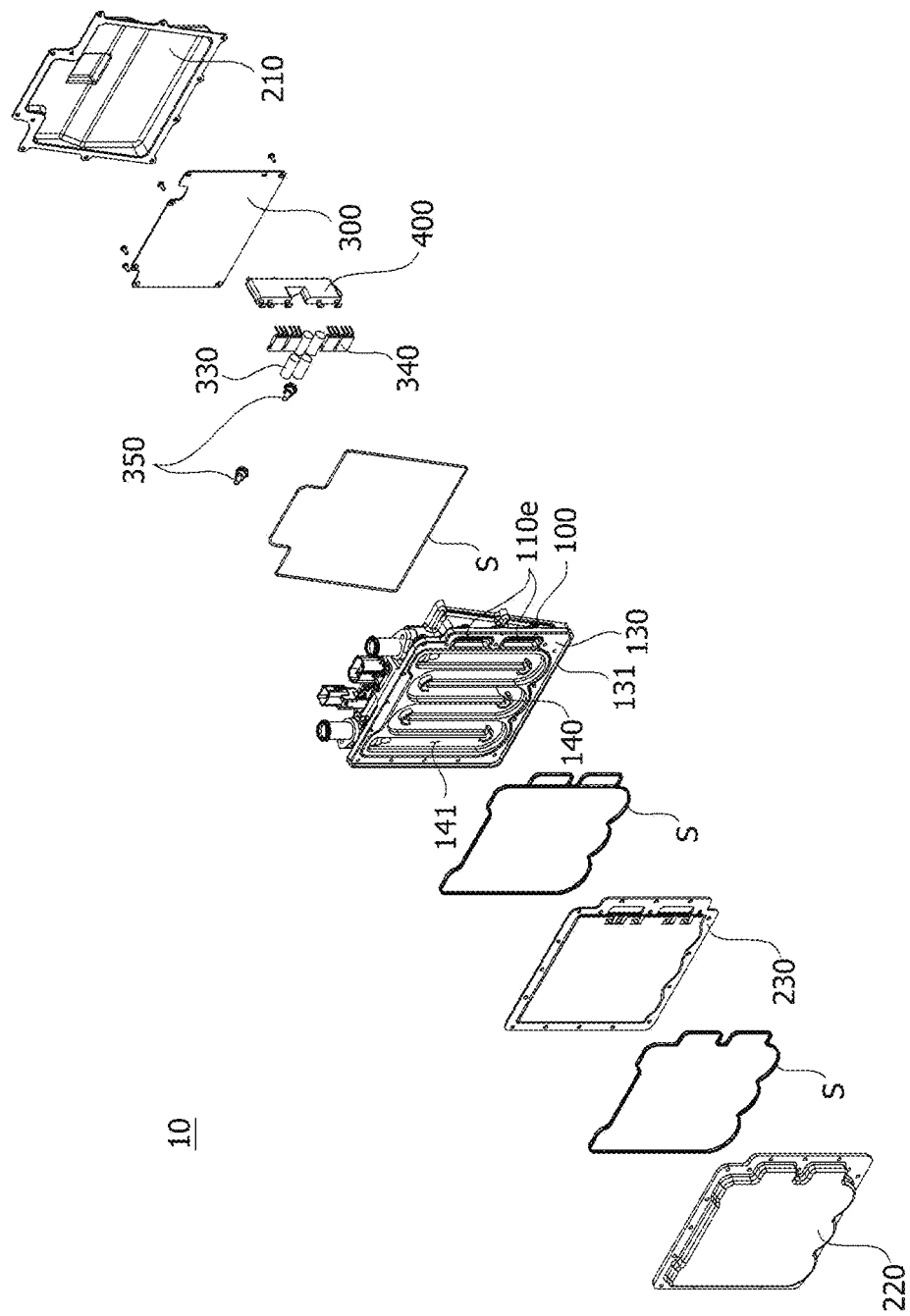
Figure 4:
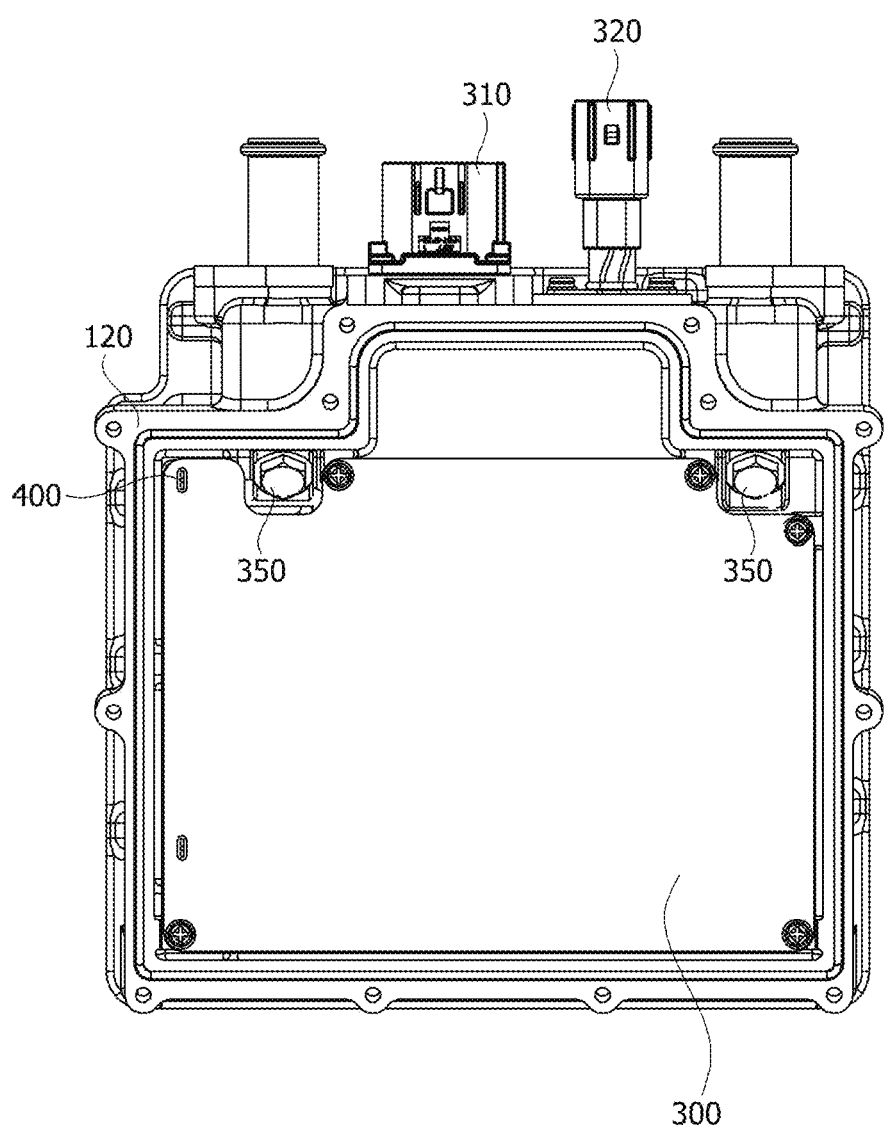
FIG. 4 is a front view showing a state in which a first cover is deleted in FIG. 1.
Figure 5:
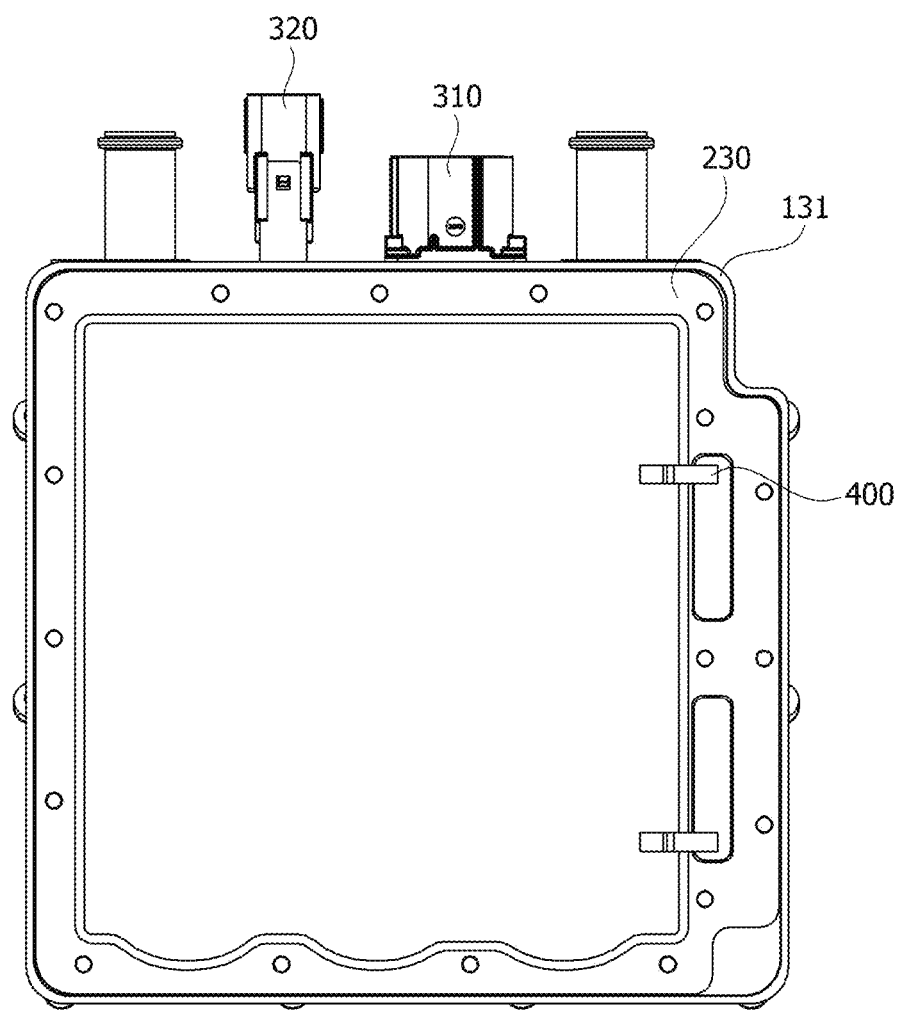
FIG. 5 is a rear view showing a state in which a second cover is deleted in FIG. 1.

FIG. 1 is a perspective view illustrating a fluid heater according to a first embodiment of the present invention, FIGS. 2 and 3 are exploded perspective views of FIG. 1, FIG. 4 is a front view showing a state in which a first cover is deleted in FIG. 1, and FIG. 5 is a rear view showing a state in which a second cover is deleted in FIG. 1.

Referring to FIGS. 1 to 5, a fluid heater 10 according to the first embodiment of the present invention may include a main body 100, a first cover 210, a second cover 220, a heating plate 230, a circuit board 300, and a bus bar 400 and may further include a first connector 310, a second connector 320, electronic elements 330 and 340, and/or water temperature sensors 350.

The main body 100 may include a partitioning part 110, a first sidewall part 120, a second sidewall part 130, a flow passage forming part 140, and a pair of protruding parts 150.

The partitioning part 110 may have a plate shape including one surface and the other surface which is a surface opposite to the one surface.

The first sidewall part 120 may be disposed on one surface of the partitioning part 110, and the second sidewall part 130 may be disposed on the other surface of the partitioning part 110.

The flow passage forming part 140 may be formed on the other surface of the partitioning part 110 to expose a flow passage 141.

The flow passage forming part 140 may have a form protruding from the other surface of the partitioning part 110 but is not necessarily limited thereto, and the partitioning part 110 may have a form in which a portion of the other surface is recessed.

The pair of protruding parts 150 may be disposed on one surface of the partitioning part 110. The pair of protruding parts 150 may be coupled to a fluid supply pipe 160 and a fluid discharge pipe 170.

A fluid may be supplied to the flow passage 141 through the fluid supply pipe 160 and may be discharged from the flow passage 141 through the fluid discharge pipe 170.

The first cover 210 may be coupled to the first sidewall part 120 by a coupling member such as a bolt to form a first accommodation space in front of the main body 100. The second cover 220 may be coupled to the second sidewall part 130 by a coupling member such as a bolt to form a second accommodation space behind the main body 100. Sealing members S such as O-rings may be interposed between the first cover 210 and the main body 100, between the second cover 220 and the heating plate 230, and between the heating plate 230 and the main body 100 to improve watertightness.

The heating plate 230 is disposed on the flow passage forming part 140 to close an exposed surface of the flow passage 141. For example, linear and curved parts forming the flow passage forming part 140 may be in contact with one surface of the heating plate 230.

The heating plate 230 may be disposed on the second sidewall part 130 and the flow passage forming part 140 and coupled to the second sidewall part 130 with the second cover 220 by a coupling member such as a bolt. The second sidewall part 130 may include an edge part 131 forming a step so that the heating plate 230 may be inserted thereinto. The edge part 131 may protrude along an edge of the second sidewall part 130 to support a side surface of the heating plate 230.

The circuit board 300 may be disposed inside the first sidewall part 120. In addition, the circuit board 300 may be coupled to a plurality of posts 111 protruding from one surface of the partitioning part 110 by coupling members such as bolts. Accordingly, the circuit board 300 may be disposed to be spaced apart from one surface of the partitioning part 110, and a space in which the electronic elements 330 and 340 may be disposed may be secured between the circuit board 300 and one surface of the partitioning part 110.

The first connector 310 and the second connector 320 may pass through the first sidewall part 120 to electrically connect an external power source (not shown) and the circuit board 300. The first connector 310 may be a high voltage connector (HV connector), and the second connector 320 may be a low voltage connector (LV connector). The circuit board 300 may receive electricity from the external power source through the first connector 310 and the second connector 320.

The electronic elements 330 and 340 may be disposed in a seating groove 112 or on a platform 113 formed on one surface of the partitioning part 110. Accordingly, the electronic elements 330 and 340 may exchange heat with the fluid flowing along the flow passage 141, wherein the partitioning part 110 may be interposed between the electronic elements 330 and 340 and the flow passage 141. Accordingly, overheating of the electronic elements 330 and 340 may be prevented, and energy efficiency may also be improved by heating the fluid using heat radiated from the electronic elements 330 and 340.

The electronic elements 330 and 340 may be electrically connected to the circuit board 300 to implement various control logics with a circuit pattern (not shown), elements (not shown), and the like printed or mounted on the circuit board 300. The electronic elements 330 and 340 may include capacitors 330, insulated gate bipolar transistors (IGBTs) 340, and the like but are not necessarily limited thereto.

The bus bar 400 may be disposed in a connecting port 110e passing through the partitioning part 110 to electrically connect a heating pattern of the heating plate 230 and the circuit board 300. The heating pattern of the heating plate 230 may receive electricity through the bus bar 400. The heating pattern may be an electrical resistor which generates heat when receiving the electricity. Meanwhile, the connecting port 110e may pass through the partitioning part 110 from an inner side of the first sidewall part 120 and an inner side of the second sidewall part 130.

Figure 6:
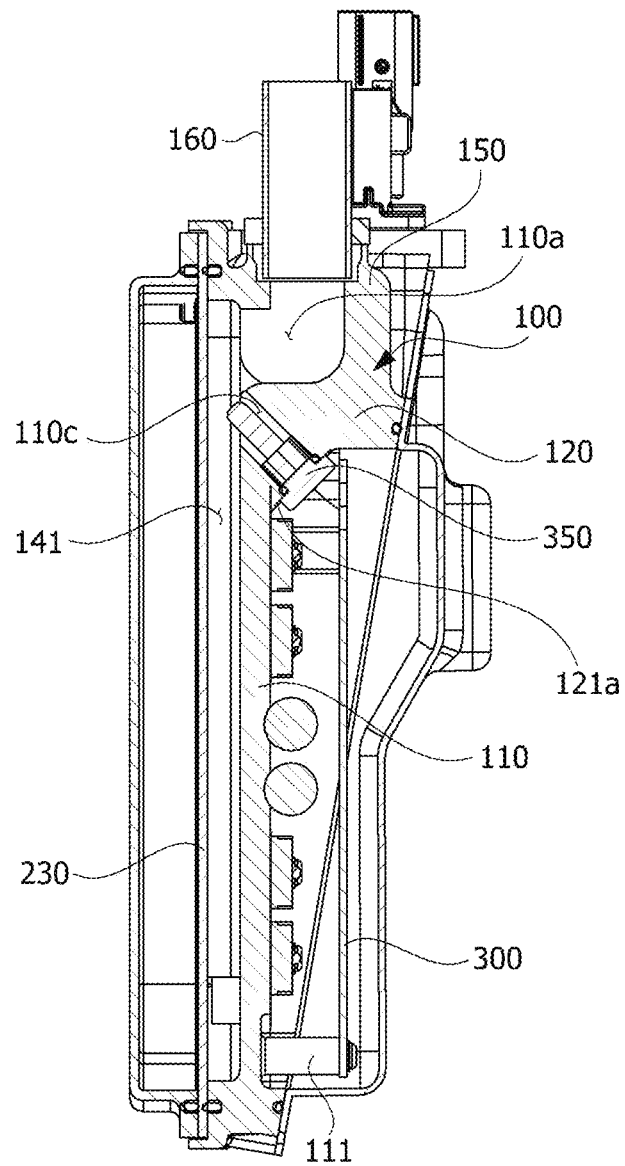
FIG. 6 is a cross-sectional view taken along line A-A of FIG. 1.
Figure 7:
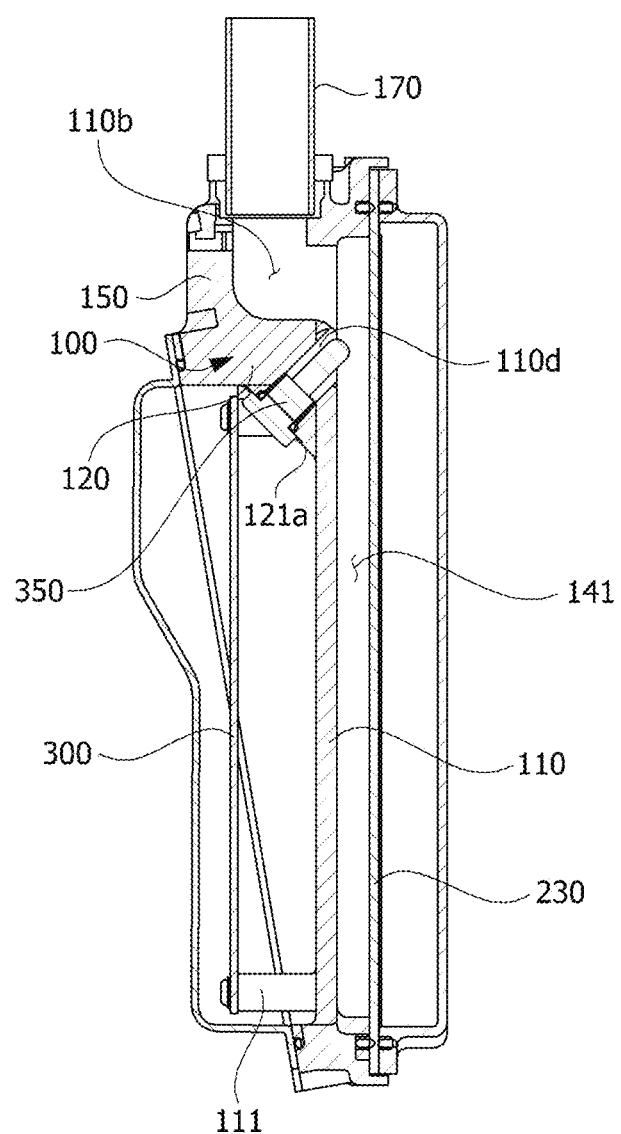
FIG. 7 is a cross-sectional view taken along line B-B of FIG. 1.

FIG. 6 is a cross-sectional view taken along line A-A of FIG. 1, and FIG. 7 is a cross-sectional view taken along line B-B of FIG. 1.

Referring to FIGS. 6 and 7, the main body 100 may include an inlet port 110a and an outlet port 110b passing through the partitioning part 110 from an outer side of the first sidewall part 120.

The inlet port 110a and the outlet port 110b may be connected to the flow passage 141, extend into the pair of protruding parts 150, and be respectively connected to the fluid supply pipe 160 and the fluid discharge pipe 170.

The pair of water temperature sensors 350 may be disposed in a pair of insertion holes 110c and 110d passing through the partitioning part 110. The insertion holes 110c and 110d pass through the partitioning part 110 from the inner side of the first sidewall part 120 to be connected to the flow passage 141. In addition, the pair of insertion holes 110c and 110d may be disposed at positions corresponding to the inlet port 110a and the outlet port 110b. That is, the pair of insertion holes 110c and 110d may be disposed to face the inlet port 110a and the outlet port 110b with the first sidewall part 120 disposed therebetween. Accordingly, the pair of water temperature sensors 350 may measure a temperature of the fluid just after the fluid is introduced into the flow passage 141 and a temperature of the fluid just before the fluid is discharged from the flow passage 141. Meanwhile, the circuit board 300 may receive temperature data from the pair of water temperature sensors 350 and adjust power supplied to the heating plate 230 on the basis of the temperature data so that the temperature of the fluid discharged from the flow passage 141 reaches a preset target temperature.

Each of the pair of insertion holes 110c and 110d may be disposed in one of a pair of inclined surfaces 121a. The inclined surfaces 121a may be obliquely disposed with respect to one surface of the partitioning part 110 and connected to an inner surface of the first sidewall part 120. The insertion holes 110c and 110d may extend in a direction inclined with respect to one surface of the partitioning part 110. Accordingly, a problem in that a jig (not shown) which holds and transfers the water temperature sensor 350 collides with the first sidewall part 120 may be reduced when the water temperature sensors 350 are installed and replaced. The insertion holes 110c and 110d may extend in a direction perpendicular to the inclined surfaces 121a but are not necessarily limited thereto.

Figure 8:
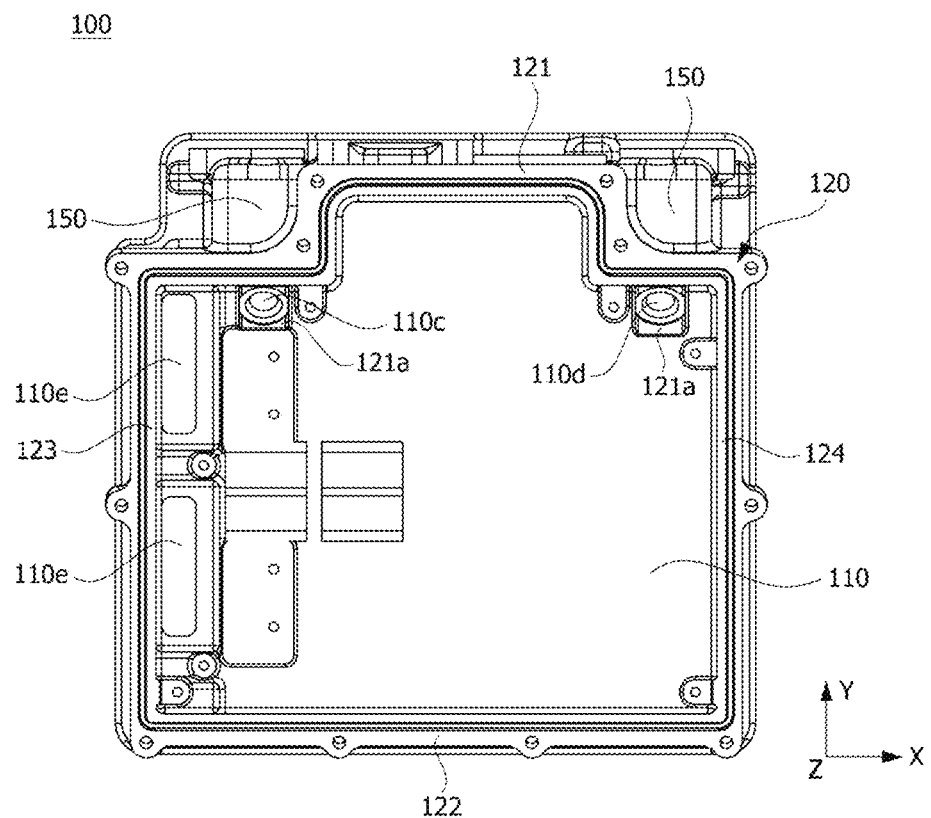
FIG. 8 is a front view illustrating a main body of FIG. 2.
Figure 9:
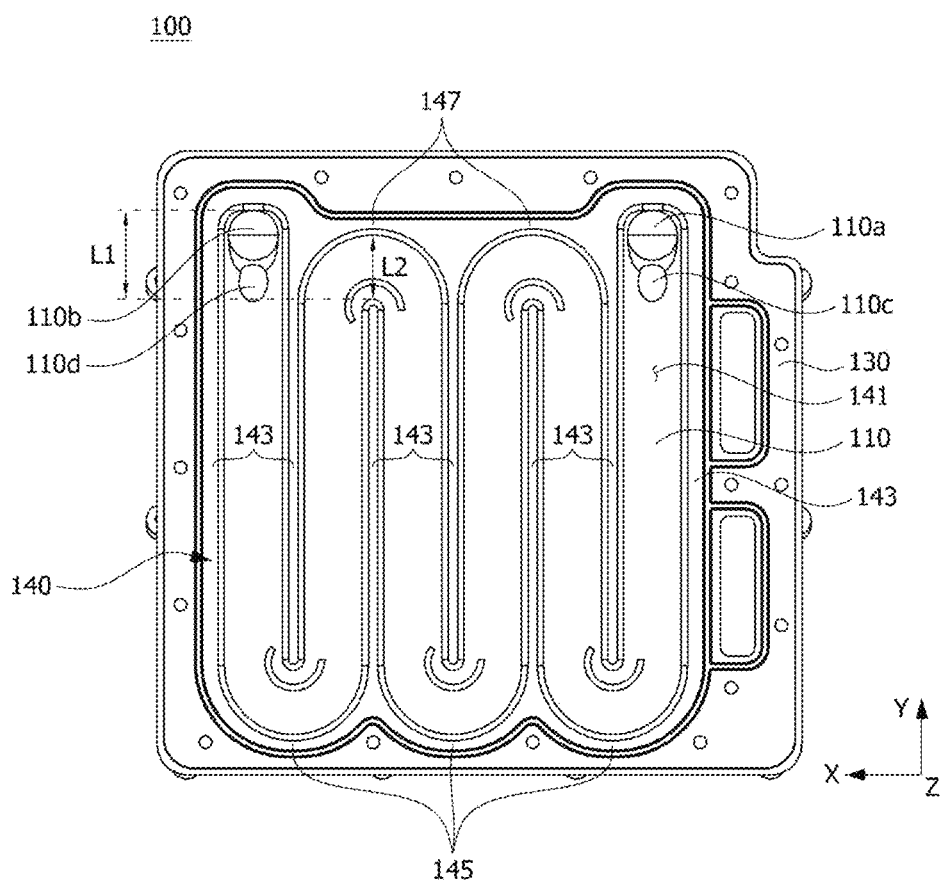
FIG. 9 is a rear view illustrating the main body of FIG. 2.
Figure 10:
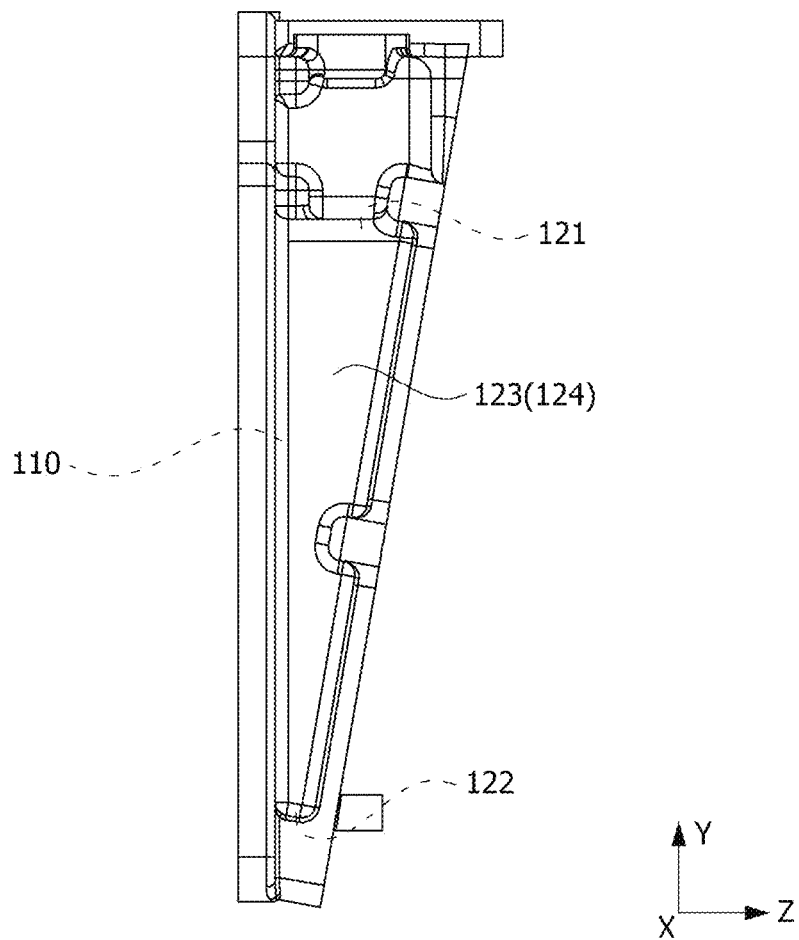
FIG. 10 is a side view illustrating the main body of FIG. 2.
Figure 11:
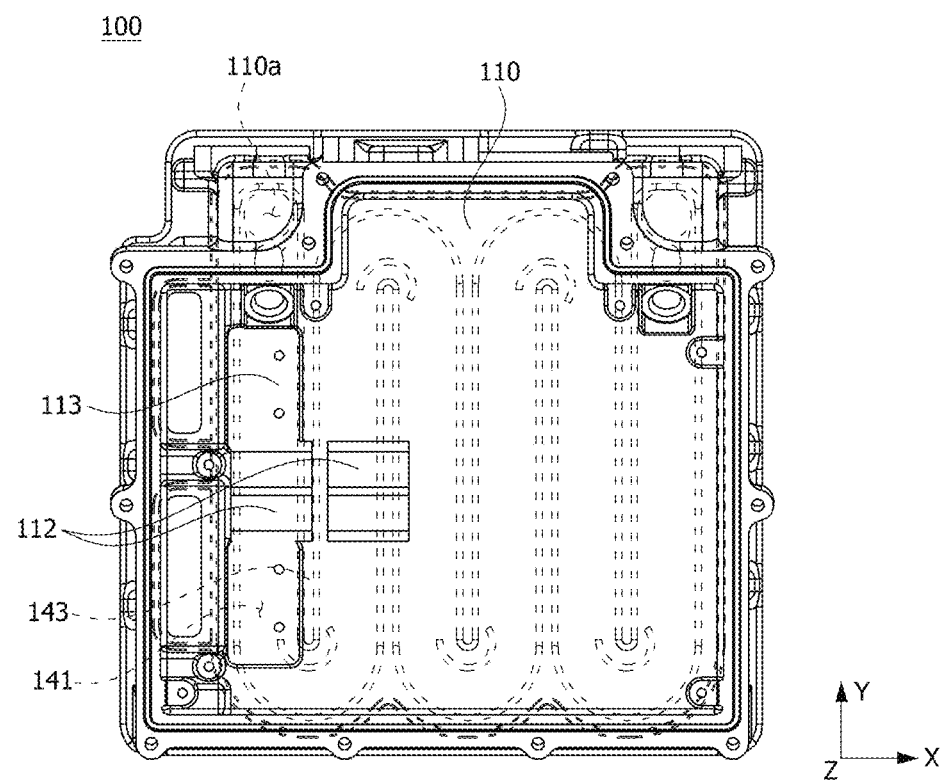
FIG. 11 is a front view in which the view of FIG. 8 overlaps the view of FIG. 9.

FIG. 8 is a front view illustrating the main body of FIG. 2, FIG. 9 is a rear view illustrating the main body of FIG. 2, FIG. 10 is a side view illustrating the main body of FIG. 2, and FIG. 11 is a front view in which the view of FIG. 8 overlaps the view of FIG. 9.

Referring to FIG. 8, the first sidewall part 120 may include a first-1 sidewall 121 and a first-2 sidewall 122 which face each other and a first-3 sidewall 123 and a first-4 sidewall 124 which connect the first-1 sidewall 121 and the first-2 sidewall 122 and face each other.

An inner surface of the first-1 sidewall 121 may be connected to the pair of inclined surfaces 121a, and an outer surface of the first-1 sidewall 121 may be connected to the pair of protruding parts 150. The pair of inclined surfaces 121a may be disposed to face the pair of protruding parts 150.

Referring to FIGS. 4 and 8, the first connector 310 and the second connector 320 may be disposed to pass through the first-1 sidewall 121. In addition, the first connector 310 and the second connector 320 may be disposed between the pair of protruding parts 150 or the pair of inclined surfaces 121a.

Referring to FIG. 9, the flow passage 141 may extend from the inlet port 110a to the outlet port 110b, and the pair of insertion holes 110c and 110d may be disposed close to the inlet port 110a and the outlet port 110b respectively.

The flow passage forming part 140 may be disposed inside the second sidewall part 130. The flow passage forming part 140 may include a plurality of linear parts 143 which are disposed in parallel and a plurality of curved parts 145 and 147 connecting the plurality of linear parts 143.

The linear parts 143 and the curved parts 145 and 147 may protrude from the other surface of the partitioning part 110.

The curved parts 145 and 147 may include first curved parts 145 and second curved parts 147 which are disposed at opposite sides with respect to the linear parts 143. For example, the first curved part 145 may be disposed at second end sides of the linear parts 143, and the second curved part 147 may be disposed at first end sides of the linear parts 143. The inlet port 110a and the outlet port 110b may be disposed at the first end sides of the linear parts 143. The plurality of first curved parts 145 may sequentially connect second ends of (odd number)$^{th}$ linear parts 143 among the plurality of linear parts 143, and the plurality of second curved parts 147 may sequentially connect first ends of (even number)$^{th}$ linear parts 143 among the plurality of linear parts 143.

In a direction parallel to the linear part 143, a maximum distance L1 from the first end of the linear part 143 to the inlet port 110a and the outlet port 110b may be greater than a maximum distance L2 from the first end of the linear part 143 to the second curved part 147. Accordingly, bubbles introduced into or generated in the flow passage 141 may be discharged to the outside of the flow passage 141 through the outlet port 110b. When the bubbles are accumulated in the flow passage 141, a local heat concentration phenomenon may occur on the heating plate, and thus the heating performance of the heating plate may be reduced, and a fire may occur.

Referring to FIGS. 8 and 10, based on one surface of the partitioning part 110, a height of the first-3 sidewall 123 and a height of the first-4 sidewall 124 may decrease in a direction away from the first-1 sidewall 121. Based on one surface of the partitioning part 110, a height of the first-2 sidewall 122 may be less than a height of the first-1 sidewall 121. Accordingly, a problem in that the jig which holds and transfers the water temperature sensor collides with the first-2 sidewall 122 may be reduced when the water temperature sensor is installed and replaced. In this case, the first cover may include a third sidewall part having a shape corresponding to the second sidewall part so that a distance between the partitioning part 110 and the first cover may be uniformly maintained over an entire region of the partitioning part 110. For example, a plate part of the first cover facing one surface of the partitioning part 110 may be disposed to be parallel to one surface of the partitioning part 110.

Referring to FIG. 11, the seating groove 112 or platform 113 may overlap the flow passage 141 in a direction passing through one surface and the other surface of the partitioning part 110. In addition, the inlet port 110*a* may overlap the seating groove 112 or platform 113 in a direction in which the flow passage 141 extends, that is, in a direction parallel to the linear part 143.

Figure 12:
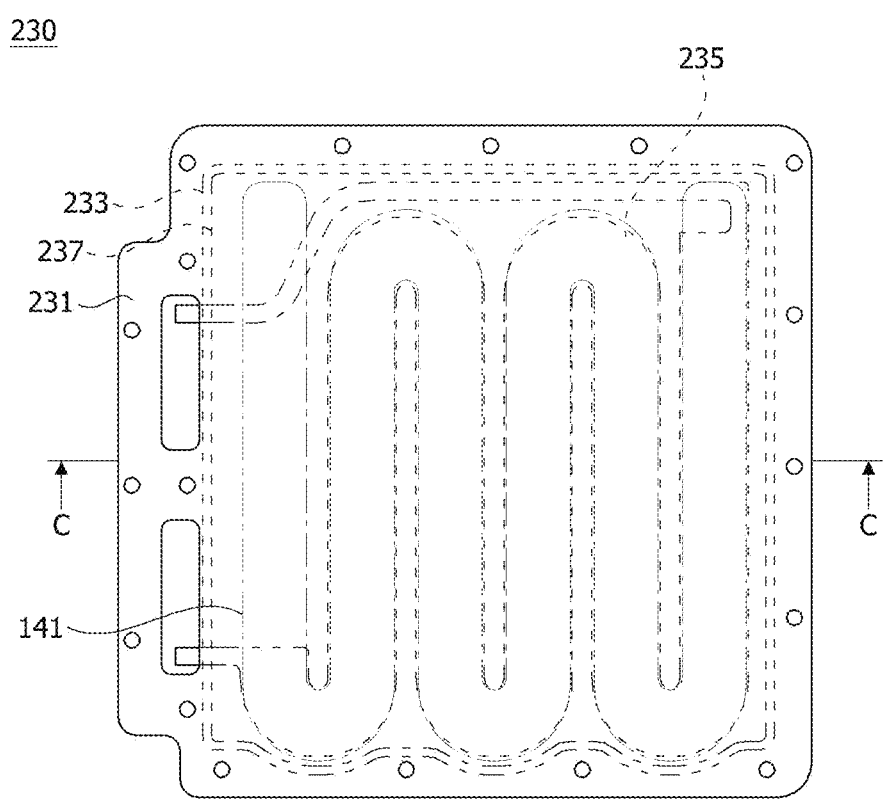
FIG. 12 is a front view illustrating a heating plate of FIG. 2.
Figure 13:
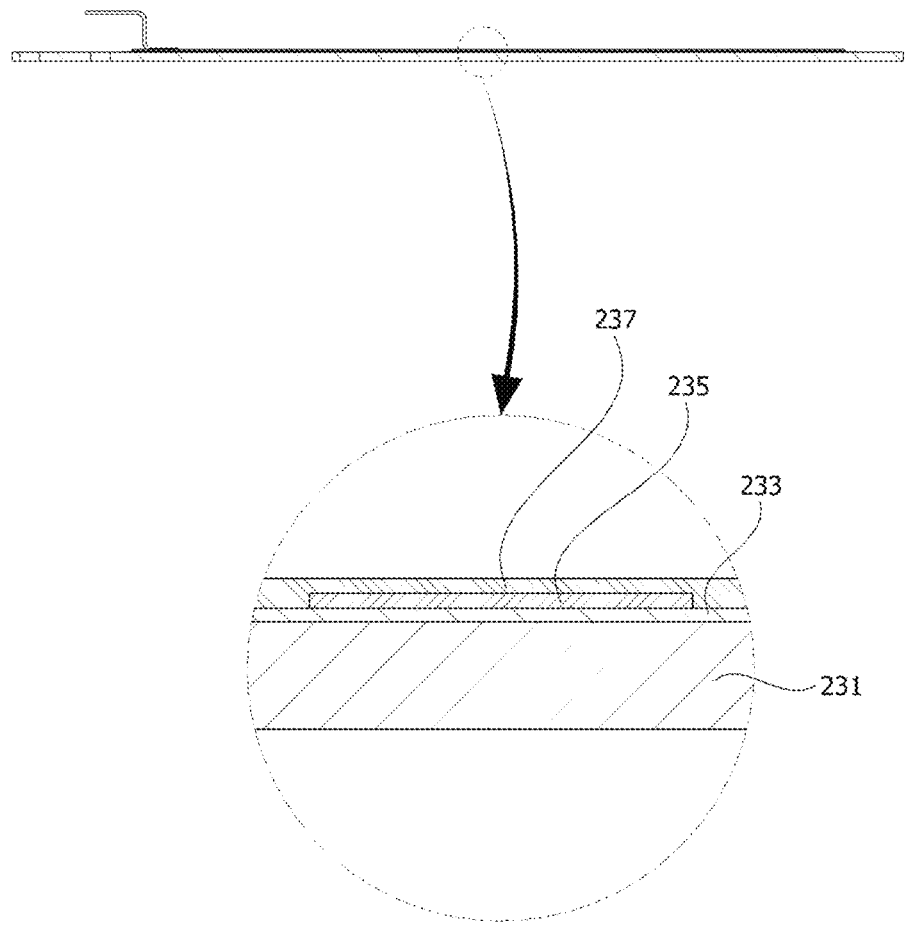
FIG. 13 is a cross-sectional view taken along line C-C of FIG. 12.

FIG. 12 is a front view illustrating the heating plate of FIG. 2, and FIG. 13 is a cross-sectional view taken along line C-C of FIG. 12.

Referring to FIGS. 12 and 13, the heating plate 230 may include a metal plate 231 having one surface in contact with the flow passage and the other surface which is a surface opposite to the one surface, a first insulating layer 233 disposed on the other surface of the metal plate 231, a heating pattern 235 disposed on the first insulating layer 233, and a second insulating layer 237 surrounding the heating pattern 235.

The metal plate 231 may include aluminum (Al), stainless steel (steel use stainless (SUS)), or the like but is not necessarily limited thereto and may include another material having high heat conductivity.

The first insulating layer 233 may electrically insulate the metal plate 231 from the heating pattern 235.

The heating plate 230 may include the heating pattern 235 corresponding to the flow passage 141. That is, the heating pattern 235 may extend along the flow passage 141. One heating pattern 235 is illustrated as being disposed in the flow passage 141, but the heating pattern 235 is not necessarily limited thereto, and two or more heating patterns 235 which are parallel may be disposed therein. In FIG. 12, for the sake of convenience in the description, the flow passage 141 formed in the main body is indicated by an alternated long and short dash line, and the first insulating layer 233, the heating pattern 235, and the second insulating layer 237 are indicated by a dotted line even though not shown on one surface of the metal plate 231 due to being formed on the other surface of the metal plate 231.

Figure 14:
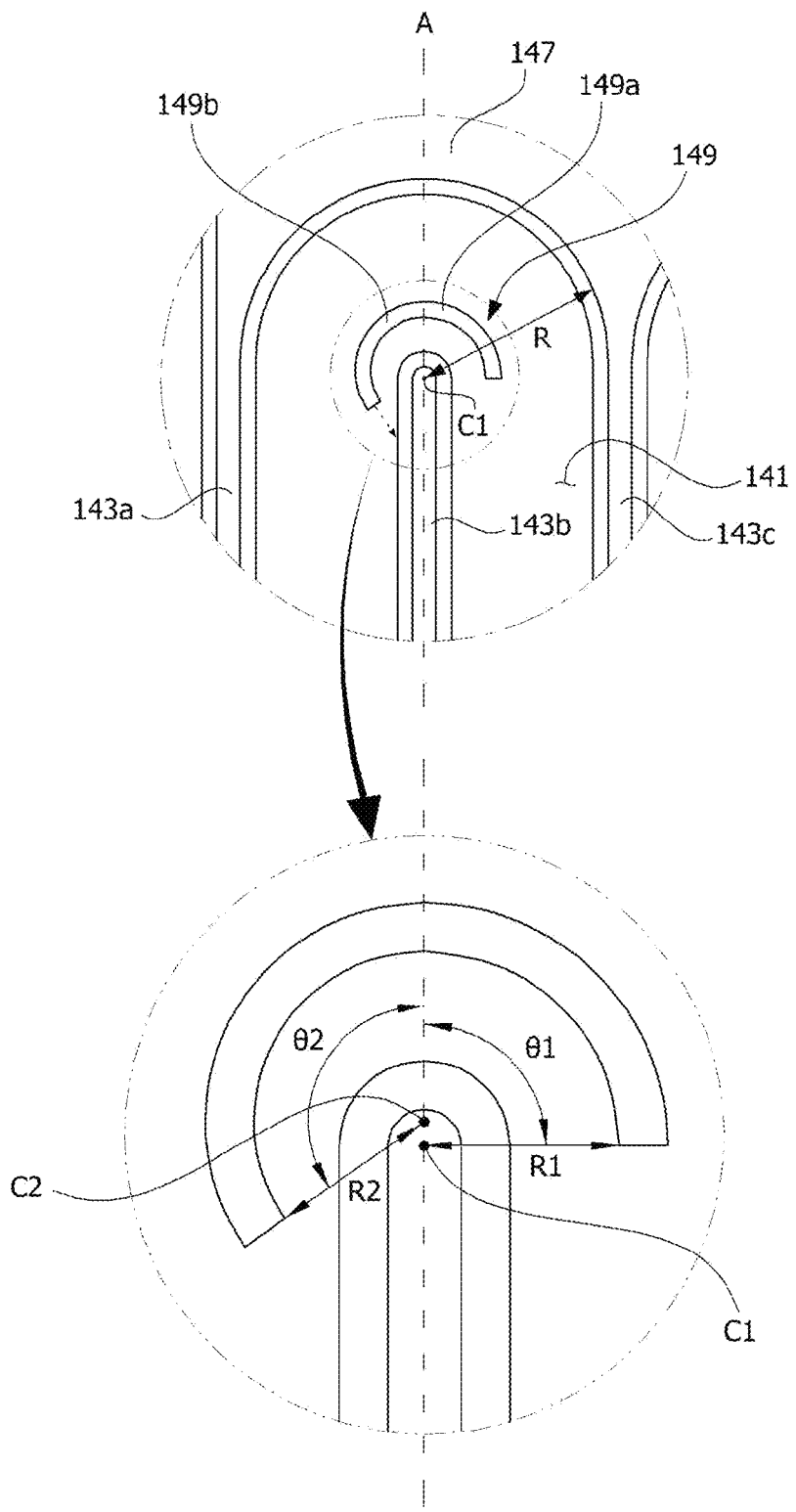
FIG. 14 is an enlarged view illustrating a portion of FIG. 9.

FIG. 14 is an enlarged view illustrating a portion of FIG. 9.

Referring to FIG. 14, the flow passage forming part 140 may include a first linear part 143*a*, a second linear part 143*b*, a third linear part 143*c*, a curved part 147, and a turning vane 149. Hereinafter, for the sake of convenience in the description, although the first curved part 145 will be mainly described, the following description of the first curved part 145 will be the same as that of a second curved part 147, or some portion of the first curved part 145 may be modified and applied to the second curved part 147 within a range clear to those skilled in the art.

The first linear part 143*a*, the second linear part 143*b*, and the third linear part 143*c* may be disposed in parallel. The second linear part 143*b* may be disposed between the first linear part 143*a* and the third linear part 143*c*.

The first linear part 143*a*, the second linear part 143*b*, the third linear part 143*c*, and the curved part 147 may protrude from the other surface of the partitioning part and be in contact with the heating plate. The turning vane 149 may protrude from the other surface of the partitioning part and be in contact with the heating plate.

The curved part 147 may connect the first linear part 143*a* and the third linear part 143*c*. An inner surface, which is in contact with the flow passage 141, of the curved part 147 may have a curvature.

The turning vane 149 may be disposed between the second linear part 143*b* and the curved part 147.

The turning vane 149 may be divided into a first curvature part 149*a* and a second curvature part 149*b* by a virtual extension line A of the second linear part 143*b*. Inner surfaces and outer surfaces of the first curvature part 149*a* and the second curvature part 149*b* may have curvatures. Hereinafter, unless specifically described otherwise, a description of a curvature will be about an inner surface of a corresponding structure.

As indicated by an arrow (dotted line), an end portion of the second curvature part 149*b* may be disposed to face the second linear part 143*b*. That is, a central angle θ2 of the second curvature part 149*b* may be greater than 90°. Accordingly, the fluid which exits the turning vane 149 may flow toward the second linear part 143*b*. For example, the central angle θ2 of the second curvature part 149*b* may be in the range of 110° to 130° and preferably 120°. When the central angle θ2 is greater than or equal to 110°, a problem of forming a flow stagnation region in which a flow speed is decreased may be reduced, wherein the flow stagnation region may be formed on one surface of the linear part 143*b* that the end portion of the second curvature part 149*b* faces, and when the central angle θ2 is 130° or less, a problem of increasing a flow speed beyond necessity or increasing a fluid resistance between the end portion of the second curvature part 149*b* and one surface of the second linear part 143*b* may be reduced. On the contrary, a central angle θ1 of the first curvature part 149*a* may be 90° or less. Accordingly, a problem of decreasing a flow speed of the fluid after the fluid is introduced inside the turning vane 149 may be reduced.

A curvature center C1 of the first curvature part 149*a* may match a curvature center of the curved part 147. The curvature center C1 of the first curvature part 149*a* may be disposed on an end portion of the second linear part 143*b*.

A ratio of a curvature radius R of the curved part 147 to a curvature radius R1 of the first curvature part 149*a* may be in the range of 2:1 to 4:1 and preferably 3:1. When the ratio of the curvature radius is greater than or equal to 2:1, an effect of solving the flow stagnation region in the end portion of the second linear part 143*b* may be improved, and when the ratio of the curvature radius is less than or equal to 4:1, an effect of solving a flow stagnation region in a region spaced apart from the end portion of the second linear part 143*b* may be improved.

A curvature radius R2 of the second curvature part 149*b* may be less than the curvature radius R1 of the first curvature part 149*a*. For example, a ratio of the curvature radius R2 of the second curvature part 149*b* to the curvature radius R1 of the first curvature part 149*a* may be 7:8. Accordingly, the curvature center C1 of the first curvature part 149*a* may be disposed to be spaced apart from a curvature center C2 of the second curvature part 149*b*. For example, the curvature center C2 of the second curvature part 149*b* may be disposed on the extension line A of the second linear part 143*b* to be closer to the curved part 147 than the curvature center C1 of the first curvature part 149*a* in a direction in which the second linear part 143*b* extends.

Referring to FIGS. 9 and 14, the second curvature part 149*b* may be disposed closer to the outlet port 110*b* than the first curvature part 149*a* along the flow passage 141. Accordingly, the fluid may flow to the second curvature part 149b through the first curvature part 149a.

Figure 15:
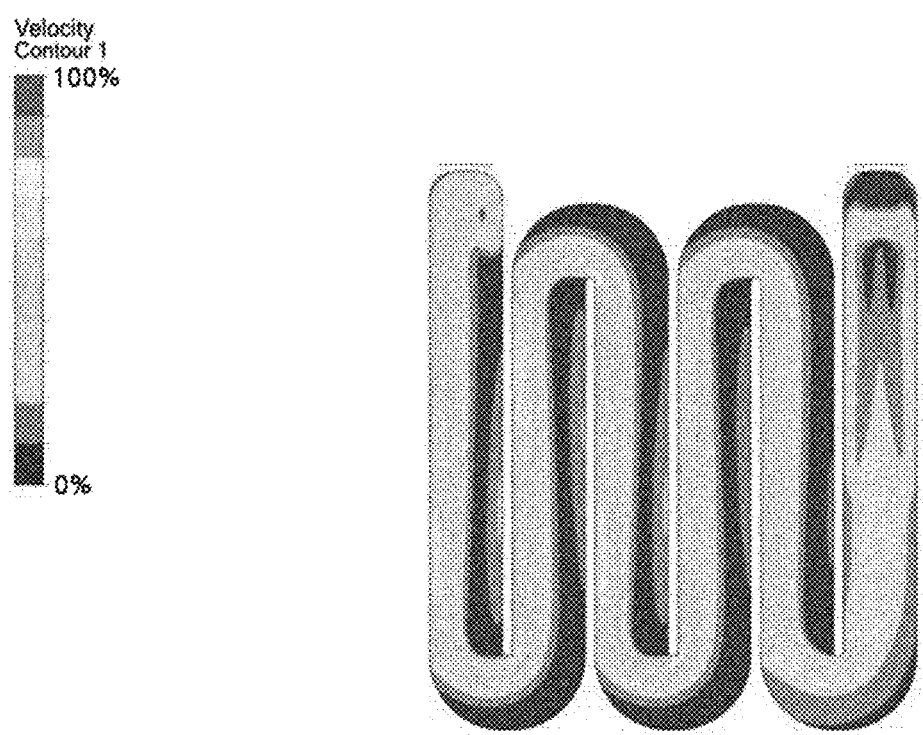
FIGS. 15 and 16 are views illustrating a difference in flow speed distribution according to installation of a turning vane of FIG. 14.
Figure 16:
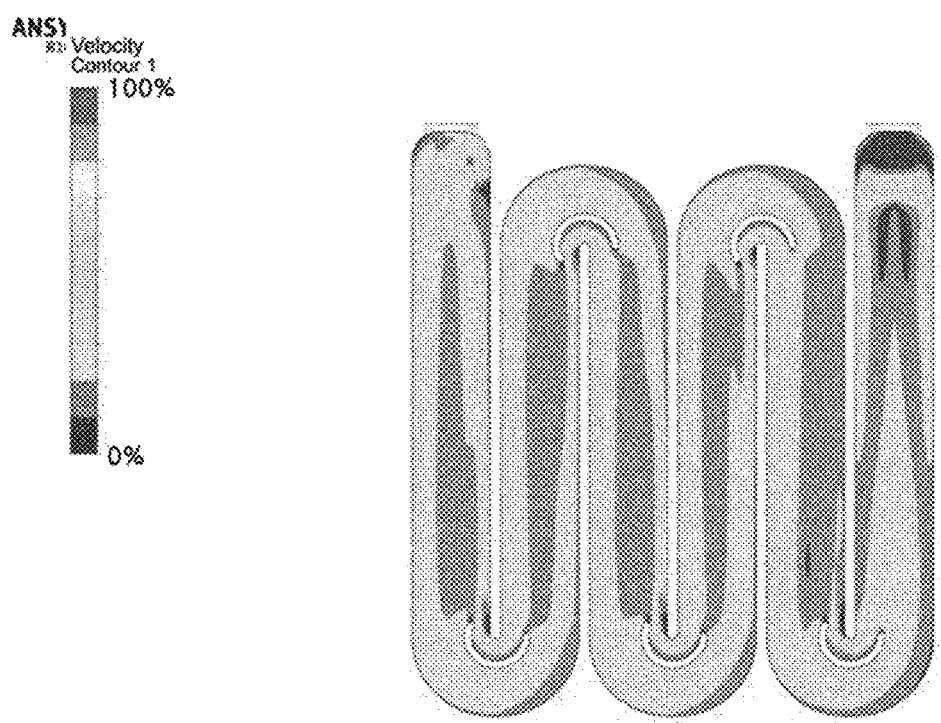

FIGS. 15 and 16 are views illustrating a difference in flow speed distribution according to installation of the turning vane of FIG. 14.

Referring to FIG. 15, in a case in which the turning vane is not installed, it may be seen that a flow stagnation region indicated by a blue color is widely formed on one surface of the linear part. In the flow stagnation region, a phenomenon in which heat is locally concentrated may occur, and thus the performance of a heating plate may be reduced, and a fire accident may also occur.

Referring to FIG. 16, in a case in which the turning vane according to the present invention is installed, it may be seen that the flow stagnation region is completely solved. Accordingly, since a flow distribution is uniformly formed, a local heat concentration phenomenon and a fire accident due to the local heat concentration phenomenon may be reduced or prevented.

Figure 17:
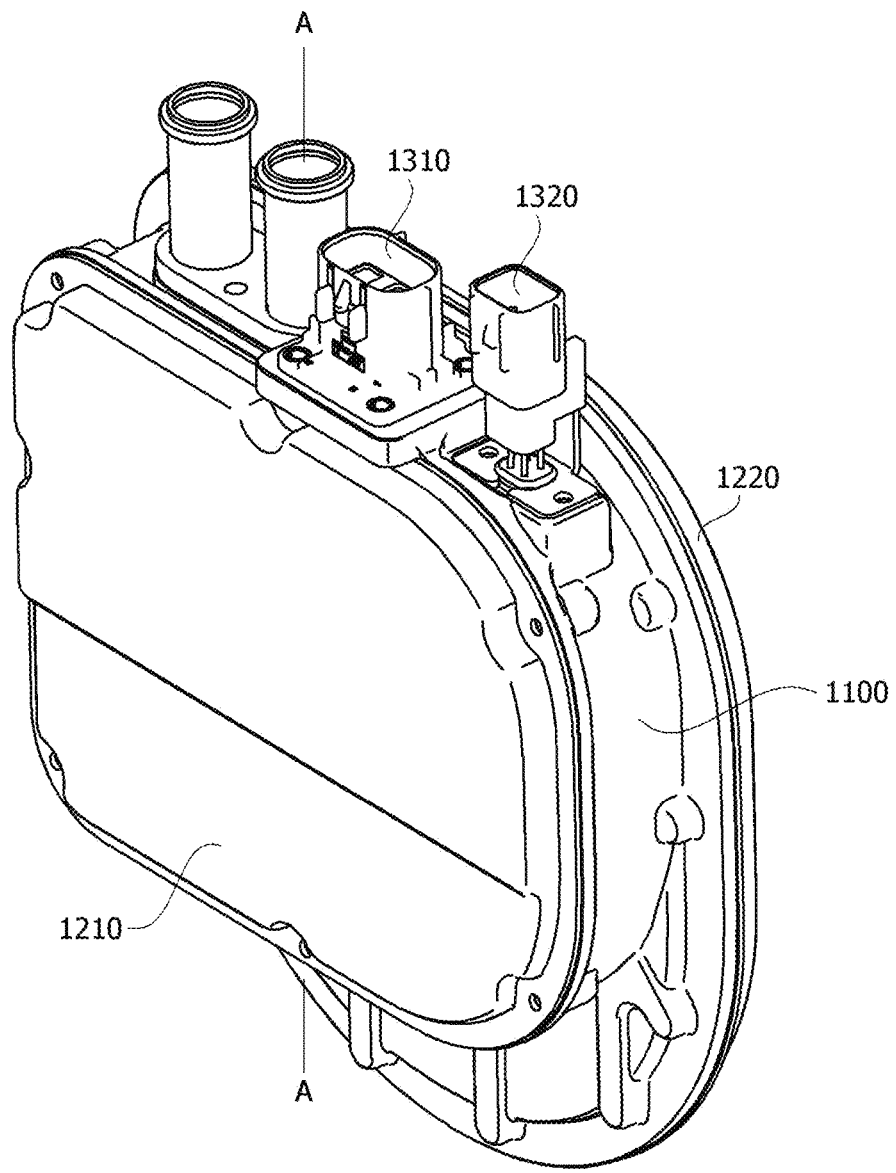
FIG. 17 is a perspective view illustrating a fluid heater according to a second embodiment of the present invention.
Figure 18:
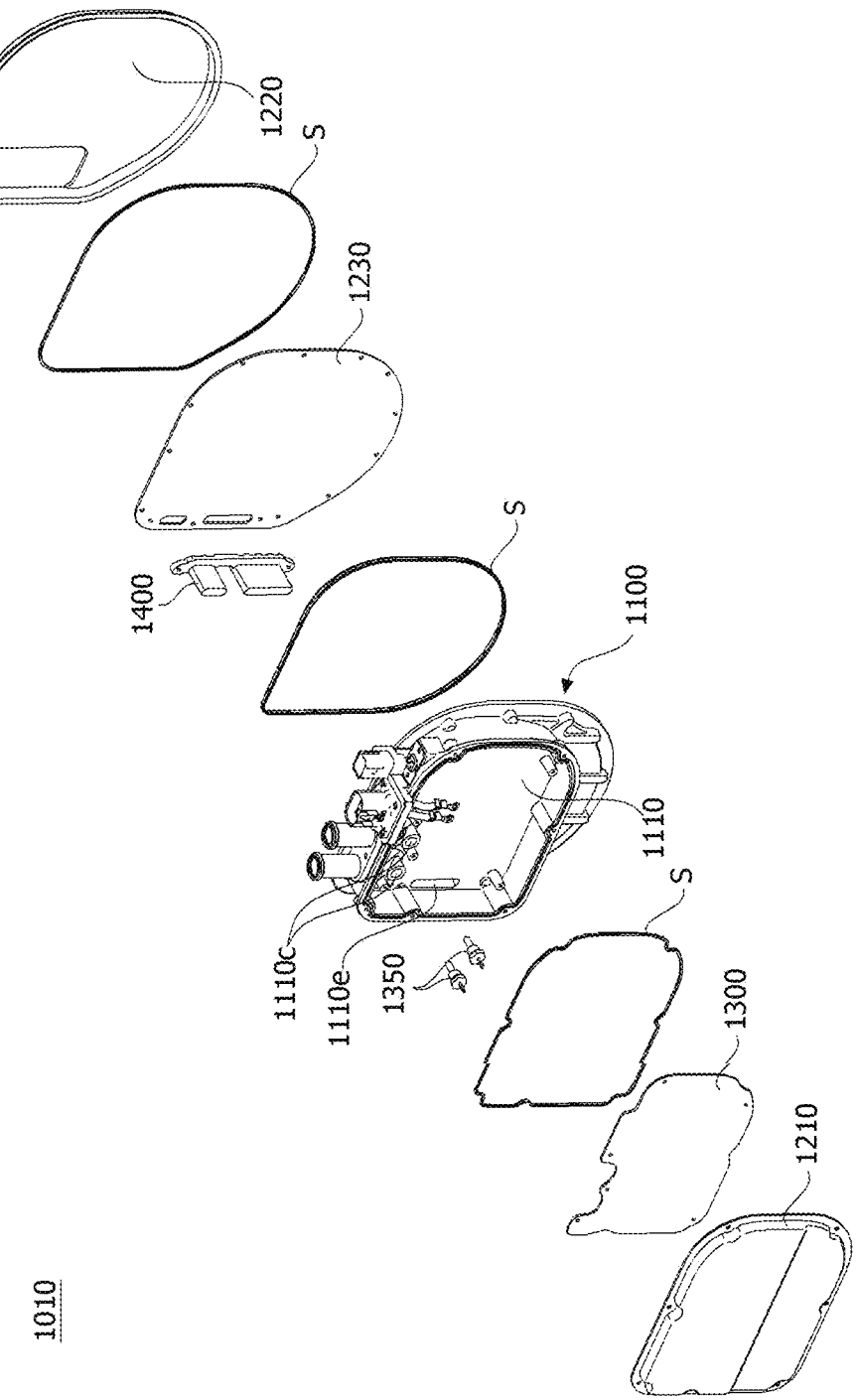
FIG. 18 is an exploded perspective view of FIG. 17.
Figure 19:
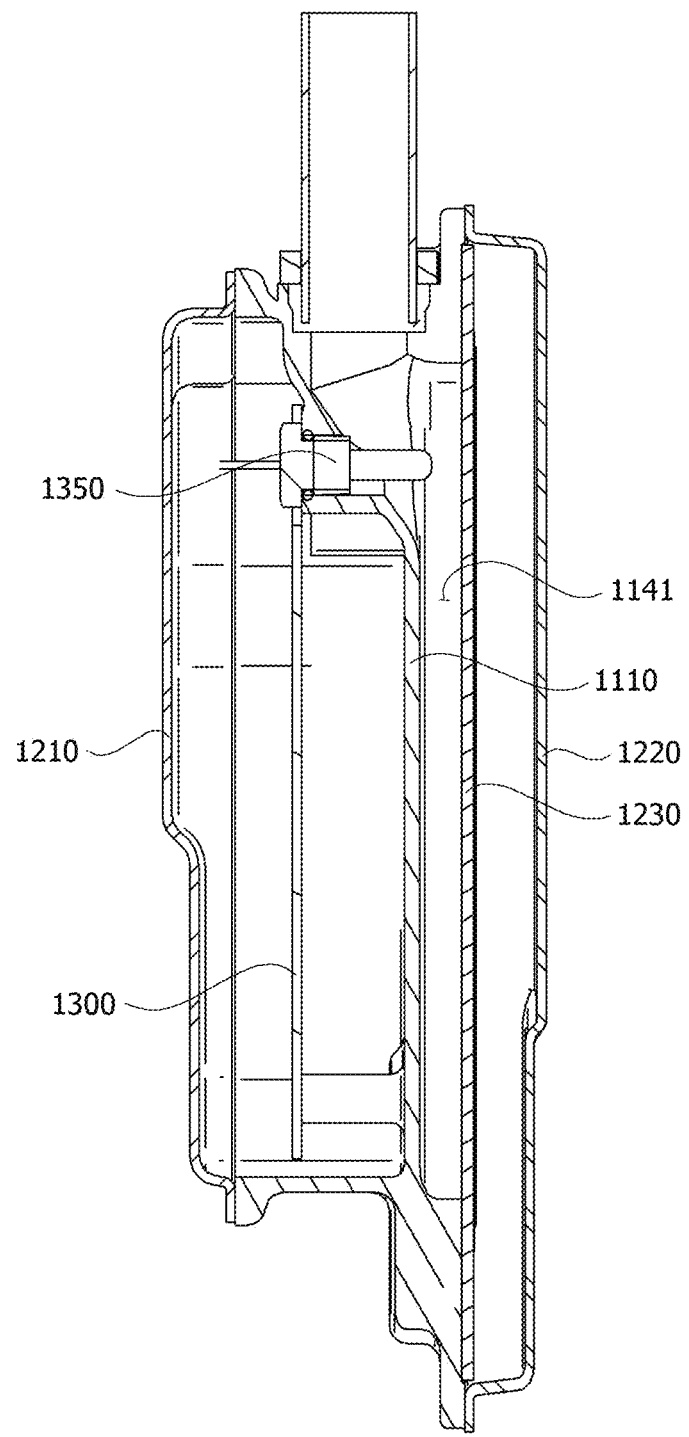
FIG. 19 is a cross-sectional view taken along line A-A of FIG. 17.
Figure 20:
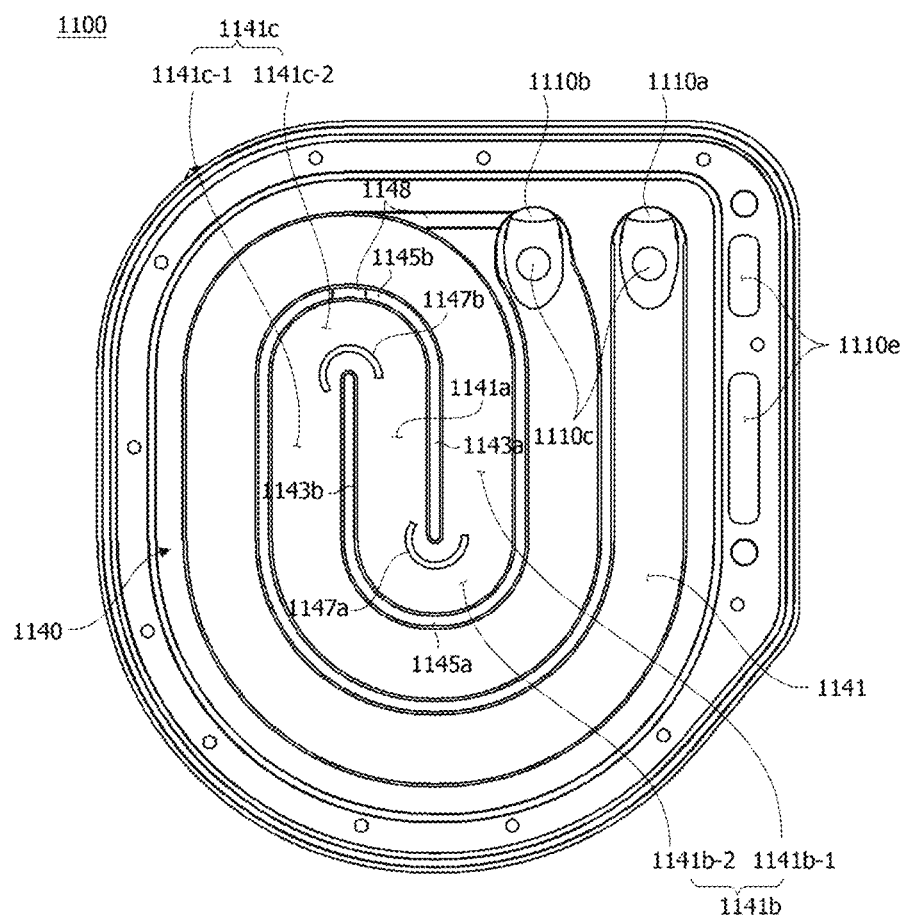
FIG. 20 is a rear view illustrating a main body of FIG. 18.
Figure 21:
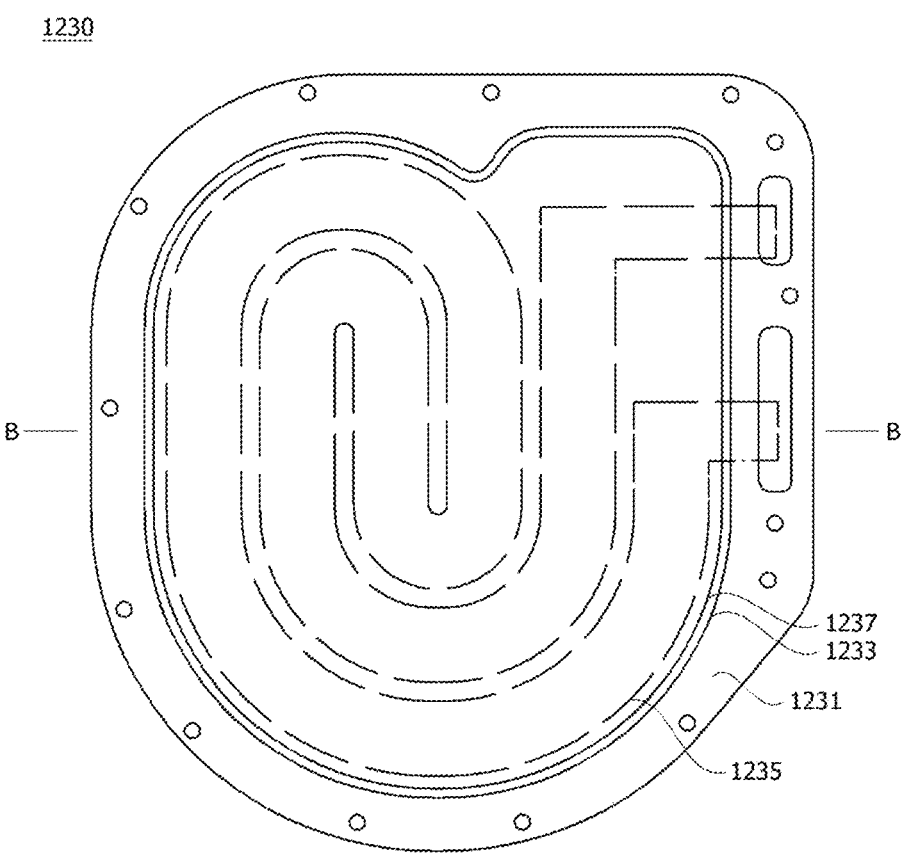
FIG. 21 is a rear view illustrating a heating plate of FIG. 18.
Figure 22:
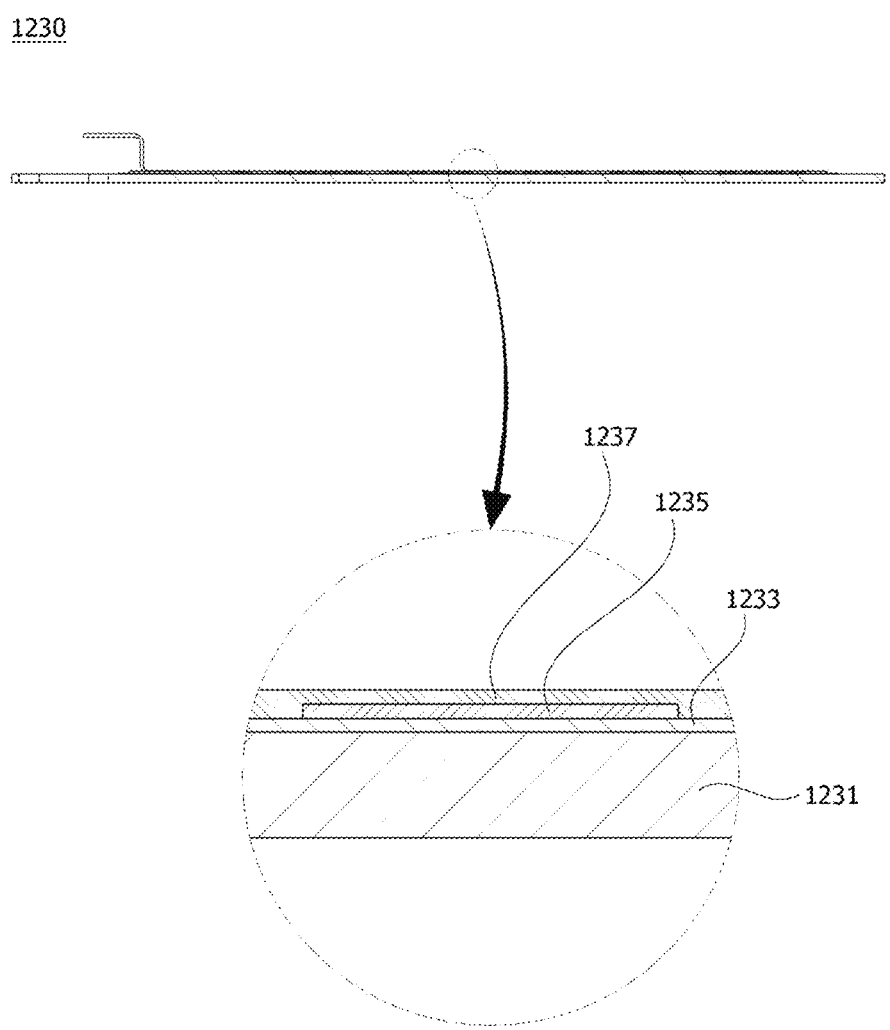
FIG. 22 is a cross-sectional view taken along line B-B of FIG. 21.

FIG. 17 is a perspective view illustrating a fluid heater according to a second embodiment of the present invention, FIG. 18 is an exploded perspective view of FIG. 17, FIG. 19 is a cross-sectional view taken along line A-A of FIG. 17, FIG. 20 is a rear view illustrating a main body of FIG. 18, FIG. 21 is a rear view illustrating a heating plate of FIG. 18, and FIG. 22 is a cross-sectional view taken along line B-B of FIG. 21.

Referring to FIGS. 17 to 22, a fluid heater 1010 according to the second embodiment of the present invention may include a main body 1100, a heating plate 1230, a circuit board 1300, and a bus bar 1400 and may further include a first cover 1210, a second cover 1220, a first connector 1310, a second connector 1320, and/or water temperature sensors 1350.

The main body 1100 may include a partitioning part 1110 and a flow passage forming part 1140 forming a flow passage 1141 on one surface of the partitioning part 1110.

The partitioning part 1110 may have a plate shape including one surface and the other surface which is a surface opposite to the one surface.

An inlet port 1110a and an outlet port 1110b passing through the partitioning part 1110 may be formed in the partitioning part 1110.

The inlet port 1110a and the outlet port 1110b may be connected to the flow passage 1141. A fluid may be supplied to the flow passage 1141 through the inlet port 1110a and discharged from the flow passage 1141 through the outlet port 1110b.

The inlet port 1110a and the outlet port 1110b may be disposed close to each other. Accordingly, both ends of a heating pattern 1235 having a shape corresponding to the flow passage 1141 may be disposed close to each other, and as a result, there is an advantage in that wires connecting the both ends of the heating pattern 1235 to the bus bar are formed to be short.

The flow passage forming part 1140 may be formed on one surface of the partitioning part 1110 to expose the flow passage 1141.

The flow passage forming part 1140 may include a plurality of linear parts 1143a and 1143b and a plurality of curved parts 1145a and 1145b which protrude from one surface of the partitioning part 1110 to form the flow passage 1141. The plurality of linear parts 1143a and 1143b may be disposed in parallel. The plurality of curved parts 1145a and 1145b may connect the plurality of linear parts 1143a and 1143b.

The flow passage 1141 may include a central flow passage 1141a, a first spiral flow passage 1141b connected to a first end of the central flow passage 1141a, and a second spiral flow passage 1141c connected to a second end of the central flow passage 1141a.

The central flow passage 1141a may be a linear flow passage which extends linearly, and the first spiral flow passage 1141b and the second spiral flow passage 1141c may be flow passages which extend spirally from the central flow passage 1141a.

The first spiral flow passage 1141b may extend from the first end of the central flow passage 1141a in a counterclockwise direction to be connected to the inlet port 1110a, and the second spiral flow passage 1141c may extend from the second end of the central flow passage 1141a in the counterclockwise direction to be connected to the outlet port 1110b. However, the first spiral flow passage 1141b and the second spiral flow passage 1141c are not necessarily limited thereto, and the first spiral flow passage 1141b and the second spiral flow passage 1141c may respectively extend from the first end and the second end of the central flow passage 1141a in a clockwise direction.

The first spiral flow passage 1141b may include a plurality of linear flow passages 1141b-1 and a plurality of curved flow passages 1141b-2 which are alternately connected and extend spirally, and the second spiral flow passage 1141c may include a plurality of linear flow passages 1141c-1 and a plurality of curved flow passages 1141c-2 which are alternately connected and extend spirally.

The flow passage forming part 1140 may include a first turning vane 1147a and a second turning vane 1147b.

The first turning vane 1147a may guide some of the fluid discharged from a first linear flow passage 1141b-1 of the first spiral flow passage 1141b through a first curved flow passage 1141b-2 thereof to the central flow passage 1141a to flow toward a first linear part 1143a between the first linear flow passage 1141b-1 and the central flow passage 1141a. The first turning vane 1147a may be disposed between a first curved part 1145a defining the first curved flow passage 1141b-2 and the first linear part 1143a.

The second turning vane 1147b may guide some of the fluid discharged from the central flow passage 1141a through a second curved flow passage 1141c-2 of the second spiral flow passage 1141c to a second linear flow passage 1141c-1 to flow toward the second linear part 1143b between the central flow passage 1141a and the second linear flow passage 1141c-1. The second turning vane 1147b may be disposed between the second curved part 1145b defining the second curved flow passage 1141c-2 and the second linear part 1143b.

That is, the first turning vane 1147a and the second turning vane 1147b may be disposed at positions, at which a flow direction of the fluid is most suddenly changed, of the flow passage 1141 to solve a flow stagnation region using a minimum number thereof. Accordingly, a flow distribution is uniformly formed, and thus a local heat concentration phenomenon and a fire accident due to the local heat concentration phenomenon may be reduced or prevented.

The first cover 1210 may be coupled to the main body 1100 by a coupling member such as a bolt to form a first accommodation space in which the circuit board 1300 is disposed in front of the main body 1100, and the second cover 1220 may be coupled to the main body 1100 by a coupling member such as a bolt to form a second accommodation space in which the heating plate 1230 is disposed behind the main body 1100. Sealing members S such as O-rings may be interposed between the first cover 1210 and the main body 1100, between the second cover 1220 and the heating plate 1230, and between the heating plate 1230 and the main body 1100 to improve watertightness.

The heating plate 1230 may be disposed on the flow passage forming part 1140 to close an exposed surface of the flow passage 1141. For example, the linear parts 1143*a* and 1143*b* and the curved parts 1145*a* and 1145*b* forming the flow passage forming part 1140 may be in contact with one surface of the heating plate 1230.

The heating plate 1230 may be coupled to the main body 1100 by a coupling member such as a bolt.

The heating plate 1230 may include a metal plate 1231 having one surface in contact with the flow passage 1141 and the other surface which is a surface opposite to the one surface, a first insulating layer 1233 disposed on the other surface of the metal plate 1231, the heating pattern 1235 disposed on the first insulating layer 1233, and a second insulating layer 1237 surrounding the heating pattern 1235.

The metal plate 1231 may include aluminum (Al), stainless steel (steel use stainless (SUS)), or the like but is not necessarily limited thereto and may include another material having a high heat conductivity.

The first insulating layer 1233 may electrically insulate the metal plate 1231 from the heating pattern 1235.

The heating pattern 1235 may be an electrical resistor which generates heat when receiving the electricity.

The heating pattern 1235 may be formed to correspond to the flow passage 1141. That is, the heating pattern 1235 may extend along the flow passage 1141. One heating pattern 1235 is illustrated as being disposed in the flow passage 1141, but the heating pattern 1235 is not necessarily limited thereto, and two or more heating patterns 1235 which are parallel may be disposed therein.

The circuit board 1300 may be coupled to the main body 1100 by a coupling member such as a bolt and disposed on the other surface of the partitioning part 1110.

The circuit board 1300 is electrically connected to the heating pattern 1235 through the bus bar 1400 to control the heating pattern 1235 to generate heat.

The first connector 1310 and the second connector 1320 are connected to the main body 1100 to electrically connect an external power source (not shown) and the circuit board 1300. The first connector 1310 may be a high voltage connector (HV connector), and the second connector 1320 may be a low voltage connector (LV connector). The circuit board 1300 may receive electricity from the external power source through the first connector 1310 and the second connector 320.

The pair of water temperature sensors 1350 may be disposed in a pair of insertion holes 1110*c* which pass through the partitioning part 1110 and are connected to the flow passage 1141. The pair of insertion holes 1110*c* may be disposed close to the inlet port 1110*a* and the outlet port 1110*b*. Accordingly, the pair of water temperature sensors 1350 may measure a temperature of the fluid just after the fluid is introduced into the flow passage 1141 and a temperature of the fluid just before the fluid is discharged from the flow passage 1141. Meanwhile, the circuit board 1300 may receive temperature data from the pair of water temperature sensors 1350 and adjust power supplied to the heating plate 1230 on the basis of the temperature data so that the temperature of the fluid discharged from the flow passage 1141 reaches a preset target temperature.

Among the pair of water temperature sensors 1350, an end portion of the water temperature sensor 1350 disposed in the insertion hole 1110*c* connected to the second spiral flow passage 1141*c* may protrude from the hole 1110*c* toward the second spiral flow passage 1141*c* and may be disposed at a side of the outlet port 1110*b* of the second spiral flow passage 1141*c*. Accordingly, the end portion of the water temperature sensor 1350 may perform a function similar to a function of a guide vane which will be described below.

The bus bar 1400 may be disposed in connecting ports 1110*e* passing through the partitioning part 1110 and electrically connect the heating pattern 1235 of the heating plate 1230 and the circuit board 1300. Accordingly, the heating pattern 1235 of the heating plate 1230 may receive electricity through the bus bar 1400.

Figure 23:
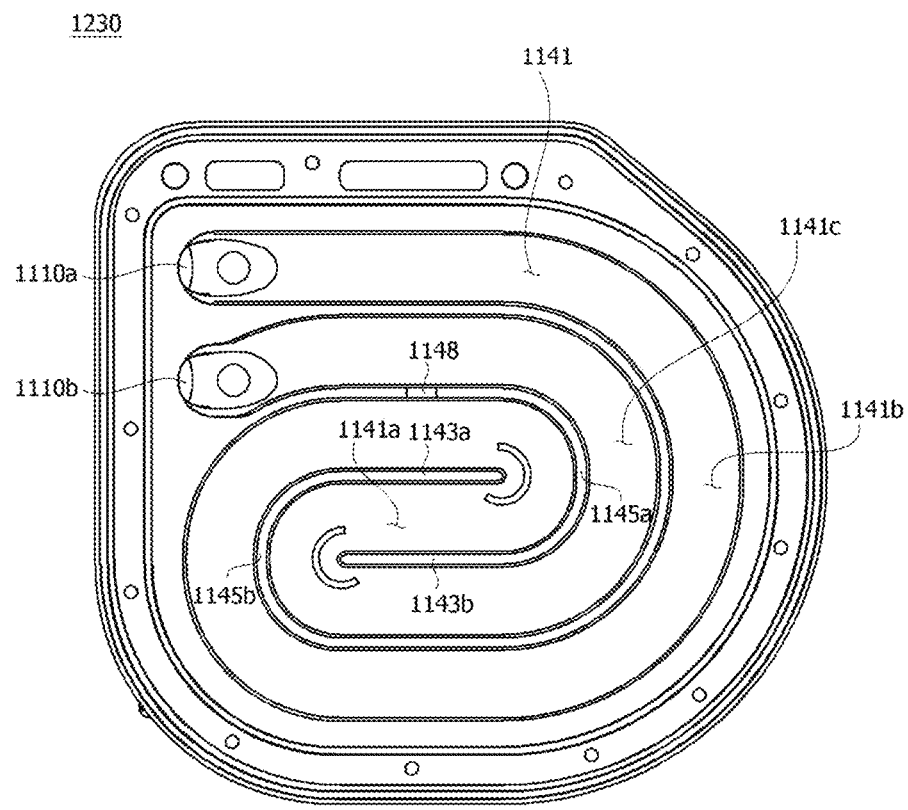
FIG. 23 is a view illustrating a modified example of FIG. 20.

FIG. 23 is a view illustrating a modified example of FIG. 20.

Referring to FIGS. 20 and 23, a gas discharge groove 1148 may be formed in a portion of a plurality of linear parts 1143*a* and 1143*b* and a plurality of curved parts 1145*a* and 1145*b* forming a flow passage forming part 1140.

The gas discharge groove 1148 may provide a bypass passage so that bubbles are not accumulated in a flow passage 1141 and are smoothly discharged to an outlet port 1110*b*.

A depth of the gas discharge groove 1148 may be less than a height of each of the linear parts 1143*a* and 1143*b* and the curved parts 1145*a* and 1145*b*. For example, in a case in which the height of each of the linear parts 1143*a* and 1143*b* and the curved parts 1145*a* and 1145*b* is 7 mm, the depth of the gas discharge groove 1148 may be 2 mm. Accordingly, the gas discharge groove 1148 may be disposed between the linear parts 1143*a* and 1143*b* and the curved parts 1145*a* and 1145*b* and a heating plate 1230.

The gas discharge groove 1148 may connect a first spiral flow passage 1141*b* and a second spiral flow passage 1141*c* but is necessarily limited thereto.

Figure 24:
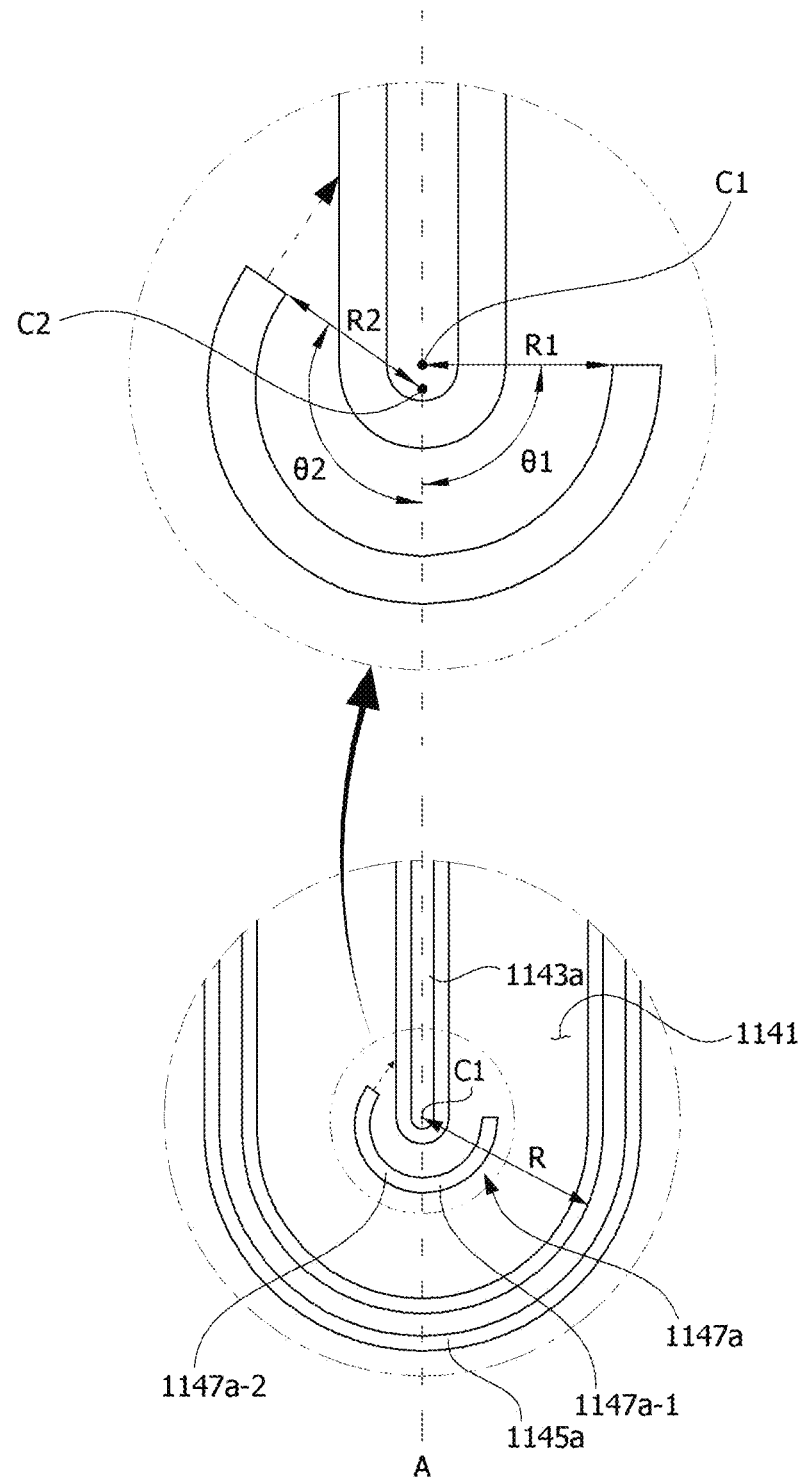
FIG. 24 is an enlarged view illustrating a first turning vane of FIG. 20.

FIG. 24 is an enlarged view illustrating the first turning vane of FIG. 20.

Referring to FIG. 24, the first turning vane 1147*a* may be divided into a first-1 curvature part 1147*a*-1 and a first-2 curvature part 1147*a*-2 by a virtual extension line A of the first linear part 1143*a*. Inner surfaces and outer surfaces of the first-1 curvature part 1147*a*-1 and the first-2 curvature part 1147*a*-2 may have curvatures. Hereinafter, unless specifically described otherwise, a description of a curvature will be about an inner surface of a corresponding structure.

The first-2 curvature part 1147*a*-2 may be disposed at a downstream side from the first-1 curvature part 1147*a*-1 in the flow passage 1141. That is, the first-2 curvature part 1147*a*-2 may be disposed closer to the outlet port 1110*b* than the first-1 curvature part 1147*a*-1 along the flow passage 1141. Accordingly, the fluid may flow to the first-2 curvature part 1147*a*-2 through the first-1 curvature part 1147*a*-1.

An end portion of the first-2 curvature part 1147*a*-2 may be disposed to face the first linear part 1143*a* as indicated by an arrow (dotted line) in the drawing. That is, a central angle $\theta 2$ of the first-2 curvature part 1147*a*-2 may be greater than 90°. Accordingly, the fluid exiting the first turning vane 1147*a* may flow toward the first linear part 1143*a*. For example, the central angle $\theta 2$ of the first-2 curvature part 1147*a*-2 may be in the range of 110° to 130° and preferably 120°. When the central angle $\theta 2$ is greater than or equal to 110°, a problem of forming a flow stagnation region in which a flow speed is decreased may be reduced, wherein the flow stagnation region may be formed on one surface of the first linear part 1143*a* that the end portion of the first-2 curvature part 1147*a*-2 faces, and when the central angle $\theta 2$ is less than or equal to 130°, a problem of increasing a flow speed beyond necessity or increasing a fluid resistance between the end portion of the first-2 curvature part 1147*a*-2 and one surface of the first linear part 1143a may be reduced. On the contrary, a central angle θ1 of the first-1 curvature part 1147a-1 may be 90° or less. Accordingly, a problem of decreasing a flow speed of the fluid after the fluid is introduced inside the first turning vane 1147a may be reduced.

A curvature center C1 of the first-1 curvature part 1147a-1 may match a curvature center of the first curved part 1145a. The curvature center C1 of the first-1 curvature part 1147a-1 may be disposed on an end portion of the first linear part 1143a.

A ratio of a curvature radius R of the first curved part 1145a to a curvature radius R1 of the first-1 curvature part 1147a-1 may be in the range of 2:1 to 4:1 and preferably 3:1. When the ratio of the curvature radius is greater than or equal to 2:1, an effect of solving the flow stagnation region in an end portion of the second linear part 1143b may be improved, and when the ratio of the curvature radius is less than or equal to 4:1, an effect of solving a flow stagnation region in a region spaced apart from the end portion of the second linear part 1143b may be improved.

A curvature radius R2 of the first-2 curvature part 1147a-2 may be less than the curvature radius R1 of the first-1 curvature part 1147a-1. For example, a ratio of the curvature radius R2 of the first-2 curvature part 1147a-2 to the curvature radius R1 of the first-1 curvature part 1147a-1 may be 7:8. Accordingly, the curvature center C1 of the first-1 curvature part 1147a-1 may be disposed to be spaced apart from a curvature center C2 of the first-2 curvature part 1147a-2. For example, the curvature center C2 of the first-2 curvature part 1147a-2 may be disposed on the extension line A of the first linear part 1143a to be closer to the first curved part 1145a than the curvature center C1 of the first-1 curvature part 1147a-1 in a direction in which the first linear part 1143a extends.

Figure 25:
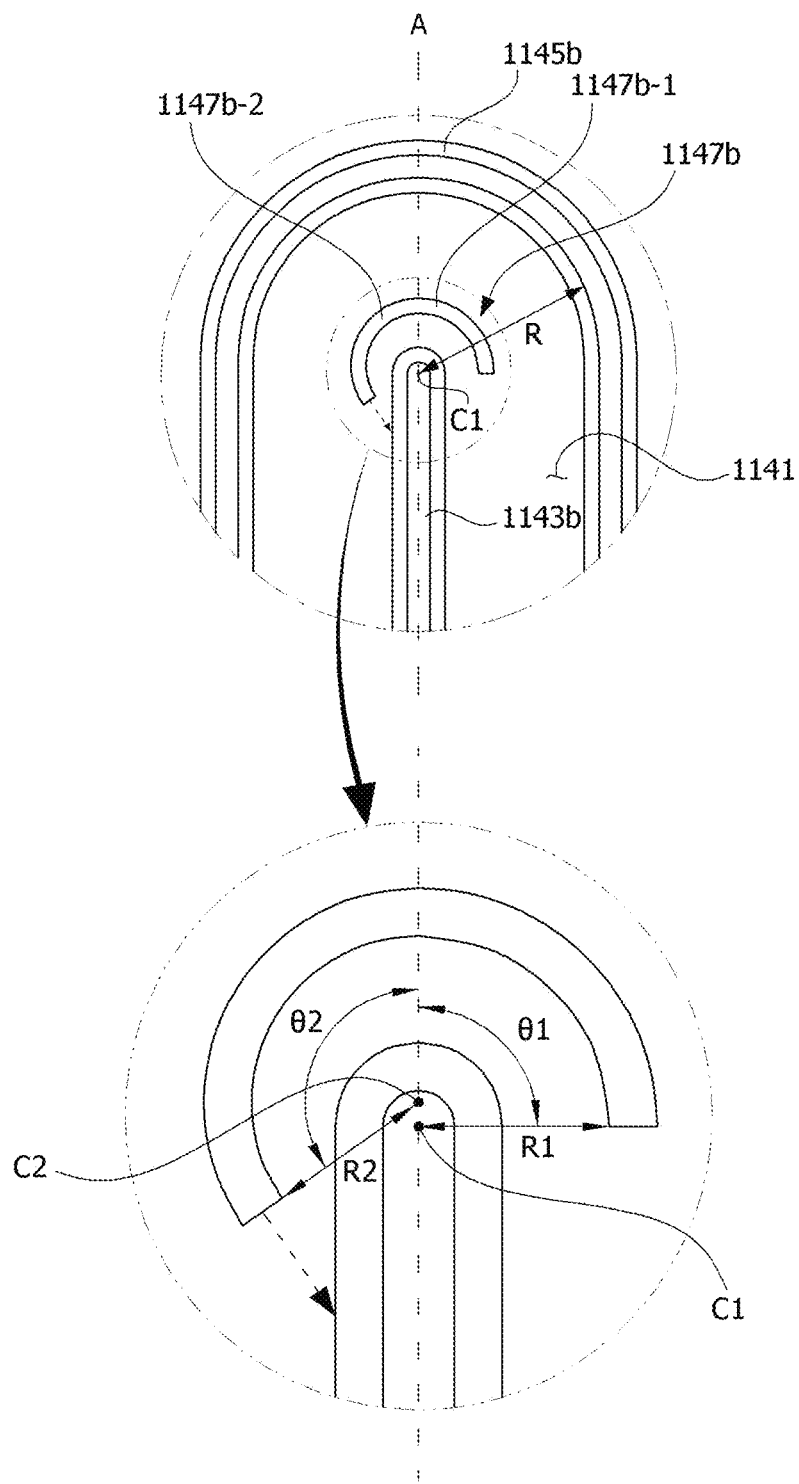
FIG. 25 is an enlarged view illustrating a second turning vane of FIG. 20.

FIG. 25 is an enlarged view illustrating the second turning vane of FIG. 20.

Referring to FIG. 25, the second turning vane 1147b may be divided into a second-1 curvature part 1147b-1 and a second-2 curvature part 1147b-2 by an extension line A of the second linear part 1143b. Inner surfaces and outer surfaces of the second-1 curvature part 1147b-1 and the second-2 curvature part 1147b-2 may have curvatures.

The second-2 curvature part 1147b-2 may be disposed at a downstream side from the second-1 curvature part 1147b-1 in the flow passage 1141. That is, the second-2 curvature part 1147b-2 may be disposed closer to the outlet port 1110b than the second-1 curvature part 1147b-1 along the flow passage 1141. Accordingly, the fluid may flow to the second-2 curvature part 1147b-2 through the second-1 curvature part 1147b-1.

An end portion of the second-2 curvature part 1147b-2 may be disposed to face the second linear part 1143b as indicated by an arrow (dotted line) in the drawing. That is, a central angle θ2 of the second-2 curvature part 1147b-2 may be greater than 90°. Accordingly, the fluid which exits the second turning vane 1147b may flow toward the second linear part 1143b. For example, the central angle θ2 of the second-2 curvature part 1147b-2 may be in the range of 110° to 130° and preferably 120°. When the central angle θ2 is greater than or equal to 110°, a problem of forming a flow stagnation region in which a flow speed is decreased may be solved, wherein the flow stagnation region may be formed on one surface of the second linear part 1143b that the end portion of the second-2 curvature part 1147b-2 faces, and when the central angle θ2 is 130° or less, a problem of increasing a flow speed beyond necessity or increasing a fluid resistance between the end portion of the second-2 curvature part 1147b-2 and one surface of the second linear part 1143b may be reduced. On the contrary, a central angle θ1 of the first curvature part 149a may be less than 90°. Accordingly, a problem of decreasing a flow speed of the fluid after the fluid is introduced inside the second turning vane 1147b may be reduced.

A curvature center C1 of the second-1 curvature part 1147b-1 may match a curvature center of the second curved part 1145b. The curvature center C1 of the second-1 curvature part 1147b-1 may be disposed on the end portion of the second linear part 1143b.

A ratio of a curvature radius R of the second curved part 1145b to a curvature radius R1 of the second-1 curvature part 1147b-1 may be in the range of 2:1 to 4:1 and preferably 3:1. When the ratio of the curvature radius is greater than or equal to 2:1, an effect of solving the flow stagnation region in the end portion of the second linear part 1143b may be improved, and when the ratio of the curvature radius is less than or equal to 4:1, an effect of solving a flow stagnation region in a region spaced apart from the end portion of the second linear part 1143b may be improved.

A curvature radius R2 of the second-2 curvature part 1147b-2 may be less than the curvature radius R1 of the second-1 curvature part 1147b-1. For example, a ratio of the curvature radius R2 of the second-2 curvature part 1147b-2 to the curvature radius R1 of the second-1 curvature part 1147b-1 may be 7:8. Accordingly, the curvature center C1 of the second-1 curvature part 1147b-1 may be disposed to be spaced apart from a curvature center C2 of the second-2 curvature part 1147b-2. For example, the curvature center C2 of the second-2 curvature part 1147b-2 may be disposed on the extension line A of the second linear part 1143b to be closer to the second curved part 1145b than the curvature center C1 of the second-1 curvature part 1147b-1 in a direction in which the second linear part 1143b extends.

Figure 26:
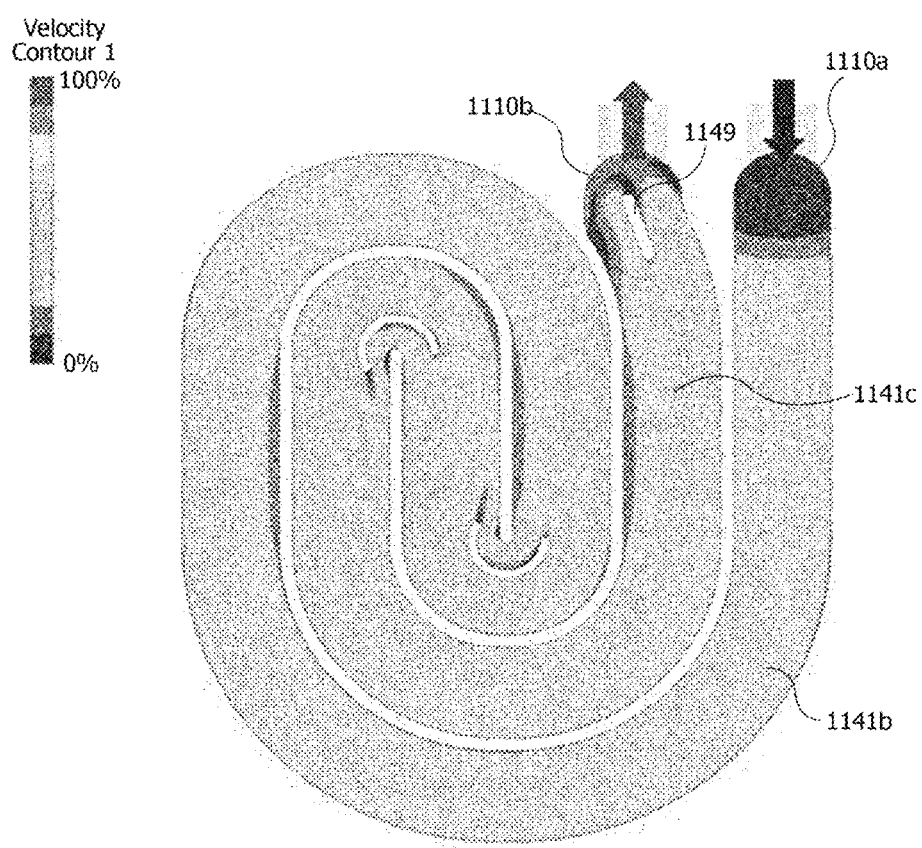
FIG. 26 is a view illustrating a flow speed distribution according to installation of the turning vane of FIG. 20.

FIG. 26 is a view illustrating a flow speed distribution according to installation of the turning vane of FIG. 20.

Referring to FIG. 26, in a case in which the first and second turning vanes according to the embodiment are installed, it may be seen that the flow stagnation region is almost completely solved. Accordingly, since a flow distribution is uniformly formed, a heat concentration phenomenon and a fire accident due to the heat concentration phenomenon may be reduced or prevented. Particularly, a guide vane 1149 may be additionally disposed at the side of the outlet port 1110b of the second spiral flow passage 1141c. The guide vane 1149 may extend parallel to an inner surface of the second spiral flow passage 1141c. Accordingly, swirling, which may be generated by the spiral flow passage, of the fluid may be reduced.

As described above, while the exemplary embodiments of the present invention have been described above, the present invention may be variously modified and changed by those skilled in the art by adding, changing, and removing components without departing from the spirit of the present invention, and the other embodiments will fall within the scope of the present invention.

The invention claimed is:

1. A fluid heater comprising:
    a main body including a partitioning part having a plate shape and a flow passage forming part forming a flow passage on the other surface of the partitioning part;
    a heating plate disposed on the flow passage forming part and having a plate shape and including a heating pattern having a shape corresponding to the flow passage;

a circuit board disposed on one surface of the partitioning part and configured to control the heating pattern to generate heat; and a bus bar electrically connecting the heating pattern and the circuit board, wherein the flow passage forming part includes a turning vane disposed in a curved flow passage of the flow passage, wherein:

the flow passage includes a plurality of linear flow passages and a plurality of curved flow passages which are alternately connected; and the turning vane guides a fluid discharged from the curved flow passage to the linear flow passage to flow toward an inner wall of the linear flow passage, wherein:

the flow passage forming part includes a first linear part, a second linear part, and a third linear part, which are disposed in parallel, and a curved part connecting the first linear part and the third linear part;

the turning vane is disposed between the second linear part and the curved part;

the turning vane is divided into a first curvature part and a second curvature part by an extension line of the second linear part; and an end portion of the second curvature part is disposed to face the second linear part.

2. The fluid heater of claim 1, wherein:

a central angle of the first curvature part is less than or equal to 90°; and a central angle of the second curvature part is greater than 90°.

3. The fluid heater of claim 2, wherein the central angle of the second curvature part is in a range of 110° to 130°.

4. The fluid heater of claim 1, wherein a curvature center of the first curvature part is disposed on the end portion of the second linear part.

5. The fluid heater of claim 1, wherein:

a curvature center of the first curvature part matches a curvature center of the curved part; and a ratio of a curvature radius of the curved part to a curvature radius of the first curvature part is in a range of 2:1 to 4:1.

6. The fluid heater of claim 1, wherein a curvature radius of the second curvature part is less than a curvature radius of the first curvature part.

7. The fluid heater of claim 6, wherein a curvature center of the second curvature part is disposed on the extension line of the second linear part to be closer to the curved part than a curvature center of the first curvature part in a direction in which the second linear part extends.

8. The fluid heater of claim 1, wherein:

the main body includes an inlet port through which the fluid is supplied to the flow passage and an outlet port through which the fluid is discharged from the flow passage;

the flow passage extends from the inlet port to the outlet port; and the second curvature part is disposed closer to the outlet port than the first curvature part.

9. A fluid heater comprising:

a main body including a partitioning part having a plate shape and a flow passage forming part forming a flow passage on the other surface of the partitioning part;

a heating plate disposed on the flow passage forming part and having a plate shape and including a heating pattern having a shape corresponding to the flow passage;

a circuit board disposed on one surface of the partitioning part and configured to control the heating pattern to generate heat; and a bus bar electrically connecting the heating pattern and the circuit board, wherein the flow passage forming part includes a turning vane disposed in a curved flow passage of the flow passage, wherein the flow passage includes:

a central flow passage having a linear shape;

a first spiral flow passage connected to a first end of the central flow passage; and a second spiral flow passage connected to a second end of the central flow passage, wherein:

the first spiral flow passage extends from the first end of the central flow passage in a clockwise or counterclockwise direction; and the second spiral flow passage extends from the second end of the central flow passage in a direction which is the same as the direction of the first spiral flow passage, wherein:

the main body includes an inlet port through which a fluid is supplied to the flow passage and an outlet port through which the fluid is discharged from the flow passage;

the first spiral flow passage is connected to the inlet port; and the second spiral flow passage is connected to the outlet port, wherein:

each of the first spiral flow passage and the second spiral flow passage includes a plurality of linear flow passages and a plurality of curved flow passages which are alternately connected; and the turning vane includes a first turning vane configured to guide the fluid discharged from a first linear flow passage of the first spiral flow passage to the central flow passage through a first curved flow passage to flow toward a first linear part between the first linear flow passage and the central flow passage and a second turning vane configured to guide the fluid discharged from the central flow passage to the second linear flow passage through a second curved flow passage of the second spiral flow passage to flow a second linear part between the central flow passage and the second linear flow passage.

10. The fluid heater of claim 9, wherein the inlet port and the outlet port are disposed close to each other.

11. The fluid heater of claim 9, wherein:

the flow passage forming part includes a first curved part defining the first curved flow passage and a second curved part defining the second curved flow passage;

the first turning vane is disposed between the first linear part and the first curved part; and the second turning vane is disposed between the second linear part and the second curved part.

12. The fluid heater of claim 9, wherein:

the first turning vane is divided into a first-1 curvature part and a first-2 curvature part by an extension line of the first linear part;

the second turning vane is divided into a second-1 curvature part and a second-2 curvature part by an extension line of the second linear part;
an end portion of the first-2 curvature part disposed at a downstream side from the first-1 curvature part in the flow passage is disposed to face the first linear part; and
an end portion of the second-2 curvature part disposed at a downstream side from the second-1 curvature part in the flow passage is disposed to face the second linear part.

13. The fluid heater of claim 12, wherein a central angle of the first-2 curvature part and a central angle of the second-2 curvature part are greater than 90°.

14. The fluid heater of claim 12, wherein:
a curvature radius of the first-2 curvature part is less than a curvature radius of the first-1 curvature part; and
a curvature radius of the second-2 curvature part is less than a curvature radius of the second-1 curvature part.

15. The fluid heater of claim 9, wherein:
the flow passage forming part includes a guide vane disposed at a side of the outlet port of the second spiral flow passage; and
the guide vane extends parallel to an inner surface of the second spiral flow passage.

* * * * *